US009381718B2

(12) United States Patent
Dorsey et al.

(10) Patent No.: US 9,381,718 B2
(45) Date of Patent: *Jul. 5, 2016

(54) MULTI-LAYERED FILMS WITH VISUALLY-DISTINCT REGIONS AND METHODS OF MAKING THE SAME

(75) Inventors: Robert T. Dorsey, Western Springs, IL (US); Michael G. Borchardt, Naperville, IL (US)

(73) Assignee: The Glad Products Company, Oakland, CA (US)

(*) Notice: Subject to any disclaimer, the term of this patent is extended or adjusted under 35 U.S.C. 154(b) by 490 days.

This patent is subject to a terminal disclaimer.

(21) Appl. No.: 13/454,474

(22) Filed: Apr. 24, 2012

(65) Prior Publication Data

US 2012/0269466 A1   Oct. 25, 2012

Related U.S. Application Data

(60) Provisional application No. 61/478,643, filed on Apr. 25, 2011.

(51) Int. Cl.
| | | |
|---|---|---|
| *B32B 5/00* | (2006.01) |
| *B32B 5/14* | (2006.01) |
| *B65D 30/08* | (2006.01) |
| *B65D 33/28* | (2006.01) |
| *B32B 27/20* | (2006.01) |
| *B32B 27/32* | (2006.01) |

(52) U.S. Cl.
CPC .............. *B32B 5/142* (2013.01); *B32B 27/205* (2013.01); *B32B 27/32* (2013.01); *B65D 31/02* (2013.01); *B65D 33/28* (2013.01); *B32B 2307/514* (2013.01); *B32B 2439/46* (2013.01); *B65D 2203/00* (2013.01); *Y02W 90/11* (2015.05); *Y10T 428/24504* (2015.01); *Y10T 428/24612* (2015.01)

(58) Field of Classification Search
CPC ........ B65D 29/02; B65D 31/00; B65D 31/02; B65D 31/10; B65D 31/16; B65D 33/02; B65D 88/1625; B65D 88/1631; B65D 2588/165; B65D 33/01; B29C 55/06; B29C 55/08; B29C 55/18; Y10T 428/2457; Y10T 428/24942
USPC .............................. 383/105, 118, 119, 71–76
See application file for complete search history.

(56) References Cited

U.S. PATENT DOCUMENTS

| | | | | |
|---|---|---|---|---|
| 2,593,328 A | * | 4/1952 | Meaker .......................... | 383/101 |
| 2,714,571 A | | 8/1955 | Irion et al. | |
| 3,029,853 A | * | 4/1962 | Piazze .............................. | 383/75 |

(Continued)

FOREIGN PATENT DOCUMENTS

| | | |
|---|---|---|
| WO | WO9013702 | 11/1990 |
| WO | WO9956953 | 11/1999 |

*Primary Examiner* — Nathan J Newhouse
*Assistant Examiner* — Peter Helvey
(74) *Attorney, Agent, or Firm* — Thomas C. Feix

(57) ABSTRACT

Multi-layered thermoplastic films include intermittent stretched regions that are visually distinct from un-stretched regions. The stretched regions can be white, opaque, and non porous. The multi-layered thermoplastic films with visually-distinct stretched regions can be formed into bags for use as trash can liners or food storage. Additionally, methods of stretching thermoplastic films to create visually distinct stretched regions include incrementally stretching a plurality of film layers, at least one of which includes a thermoplastic material and a voiding agent.

20 Claims, 20 Drawing Sheets

(56) References Cited

U.S. PATENT DOCUMENTS

| | | | |
|---|---|---|---|
| 3,058,868 A | 10/1962 | Schroeder | |
| 3,130,647 A * | 4/1964 | Anderson et al. | 493/193 |
| 3,220,057 A * | 11/1965 | Walton | 425/385 |
| 3,224,574 A * | 12/1965 | McConnell et al. | 242/160.1 |
| 3,318,759 A | 5/1967 | Anderson | 428/340 |
| 3,322,613 A * | 5/1967 | Rasmussen | 428/484.1 |
| 3,485,437 A * | 12/1969 | Gruentzel et al. | 383/107 |
| 3,494,457 A * | 2/1970 | Titchenal | 206/484 |
| 3,549,381 A * | 12/1970 | Kinsinger | 426/77 |
| 3,550,839 A * | 12/1970 | Clayton et al. | 383/116 |
| 3,622,422 A | 11/1971 | Newman et al. | |
| 3,735,918 A * | 5/1973 | Tundermann | 383/32 |
| 3,746,607 A * | 7/1973 | Harmon et al. | 428/167 |
| 3,760,940 A * | 9/1973 | Bustin | 383/35 |
| 3,772,968 A * | 11/1973 | Ruda | 493/225 |
| 3,857,144 A | 12/1974 | Bustin | |
| 3,973,063 A * | 8/1976 | Clayton | 428/35.2 |
| 3,984,047 A * | 10/1976 | Clayton et al. | 383/119 |
| 4,076,121 A * | 2/1978 | Clayton et al. | 206/390 |
| 4,116,892 A | 9/1978 | Schwarz | |
| 4,153,664 A | 5/1979 | Sabee | |
| 4,153,751 A | 5/1979 | Schwarz | |
| 4,273,549 A * | 6/1981 | Pezzana et al. | 493/196 |
| 4,289,832 A | 9/1981 | Schwarz | |
| 4,302,495 A | 11/1981 | Marra | |
| 4,343,848 A | 8/1982 | Leonard, Jr. | |
| 4,379,197 A | 4/1983 | Cipriani | |
| 4,438,167 A | 3/1984 | Schwarz | |
| 4,517,714 A | 5/1985 | Sneed et al. | |
| 4,518,643 A * | 5/1985 | Francis | 428/131 |
| 4,522,203 A | 6/1985 | Mays | |
| 4,614,679 A | 9/1986 | Farrington, Jr. et al. | |
| 4,629,064 A * | 12/1986 | Barner | 206/204 |
| 4,692,368 A | 9/1987 | Taylor et al. | |
| 4,704,238 A | 11/1987 | Okuyama et al. | |
| 4,753,840 A | 6/1988 | Van Gompel | |
| 4,793,885 A * | 12/1988 | Rasmussen | 156/200 |
| 4,814,135 A | 3/1989 | Heitz | |
| 4,846,586 A * | 7/1989 | Bruno | 383/9 |
| 4,857,600 A | 8/1989 | Gross et al. | |
| 4,890,936 A * | 1/1990 | Cooper | 383/109 |
| 4,925,711 A * | 5/1990 | Akao et al. | 428/35.2 |
| 4,930,905 A | 6/1990 | Sharps, Jr. | |
| 4,993,844 A * | 2/1991 | Robinson et al. | 383/38 |
| 5,028,289 A * | 7/1991 | Rasmussen | 156/229 |
| 5,035,941 A | 7/1991 | Blackburn | |
| 5,076,988 A | 12/1991 | Rifi | |
| 5,078,508 A * | 1/1992 | Johan et al. | 383/75 |
| 5,100,721 A | 3/1992 | Akao | |
| 5,133,607 A * | 7/1992 | Bonke | 383/75 |
| 5,153,382 A | 10/1992 | Gross et al. | |
| 5,167,897 A * | 12/1992 | Weber et al. | 264/288.8 |
| 5,205,650 A * | 4/1993 | Rasmussen | 383/107 |
| 5,293,184 A | 3/1994 | Ishizuka | 347/1 |
| 5,296,184 A * | 3/1994 | Wu et al. | 264/154 |
| 5,382,461 A | 1/1995 | Wu | |
| 5,390,875 A * | 2/1995 | Gietman et al. | 242/521 |
| 5,422,172 A | 6/1995 | Wu | |
| 5,455,992 A * | 10/1995 | Kurschatke et al. | 26/99 |
| 5,518,801 A | 5/1996 | Chappell et al. | |
| 5,554,093 A * | 9/1996 | Porchia et al. | 493/240 |
| 5,618,111 A * | 4/1997 | Porchia et al. | 383/63 |
| 5,650,214 A * | 7/1997 | Anderson et al. | 428/152 |
| 5,716,137 A * | 2/1998 | Meyer | 383/75 |
| 5,804,265 A * | 9/1998 | Saad et al. | 428/35.2 |
| 5,851,937 A | 12/1998 | Wu et al. | |
| 5,861,074 A | 1/1999 | Wu | |
| 5,865,926 A | 2/1999 | Wu et al. | |
| 5,881,883 A | 3/1999 | Siegelman | 206/720 |
| 5,885,262 A | 3/1999 | Wheeler | 604/327 |
| 6,013,151 A | 1/2000 | Wu et al. | |
| 6,059,458 A * | 5/2000 | Belias et al. | 383/75 |
| 6,139,185 A | 10/2000 | Hamilton et al. | |
| 6,139,186 A * | 10/2000 | Fraser | 383/77 |
| 6,150,647 A | 11/2000 | Anderson et al. | |
| 6,183,856 B1 * | 2/2001 | Amon | 428/318.4 |
| 6,194,060 B1 * | 2/2001 | Amon et al. | 428/315.9 |
| 6,214,147 B1 | 4/2001 | Mortellite et al. | |
| 6,254,736 B1 | 7/2001 | Earl et al. | |
| 6,264,872 B1 * | 7/2001 | Majors et al. | 264/284 |
| 6,265,045 B1 | 7/2001 | Mushaben | |
| 6,361,784 B1 | 3/2002 | Brennan et al. | |
| 6,368,444 B1 * | 4/2002 | Jameson et al. | 156/229 |
| 6,385,818 B1 | 5/2002 | Savicki, Sr. | |
| 6,394,651 B2 | 5/2002 | Jackson | |
| 6,394,652 B2 * | 5/2002 | Meyer et al. | 383/118 |
| 6,402,377 B1 * | 6/2002 | Vo et al. | 383/75 |
| 6,416,452 B1 * | 7/2002 | Meyer | 493/210 |
| 6,513,975 B1 * | 2/2003 | Jackson et al. | 383/118 |
| 6,569,527 B1 * | 5/2003 | Calhoun et al. | 428/402 |
| 6,695,476 B2 * | 2/2004 | Jackson et al. | 383/77 |
| 6,799,680 B2 * | 10/2004 | Mak | 206/524.8 |
| 6,939,042 B2 * | 9/2005 | Rusnak et al. | 383/71 |
| 6,966,697 B2 * | 11/2005 | Patridge et al. | 383/107 |
| 7,132,151 B2 | 11/2006 | Rasmussen | |
| 7,220,053 B2 * | 5/2007 | Wu | 383/105 |
| 7,270,861 B2 * | 9/2007 | Broering et al. | 428/35.7 |
| 7,306,729 B2 | 12/2007 | Bacino et al. | |
| 7,687,134 B2 * | 3/2010 | Withers | 428/156 |
| 7,901,758 B2 | 3/2011 | Rasmussen | |
| 7,938,635 B2 * | 5/2011 | Heilman et al. | 425/101 |
| 8,263,210 B2 * | 9/2012 | Rasmussen | 428/174 |
| 8,309,206 B2 | 11/2012 | Rasmussen | |
| 8,557,364 B2 | 10/2013 | Rasmussen | |
| 2002/0074691 A1 | 6/2002 | Mortellite et al. | |
| 2002/0187361 A1 * | 12/2002 | Amon | 428/516 |
| 2003/0007704 A1 * | 1/2003 | Miller | 383/76 |
| 2003/0024625 A1 * | 2/2003 | McAmish et al. | 156/73.1 |
| 2004/0134923 A1 * | 7/2004 | Aquino et al. | 220/912 |
| 2004/0179754 A1 * | 9/2004 | Taheri | 383/38 |
| 2005/0123726 A1 * | 6/2005 | Broering et al. | 428/172 |
| 2005/0129337 A1 * | 6/2005 | Sabounjian | 383/117 |
| 2006/0083900 A1 * | 4/2006 | Ashraf | 428/182 |
| 2006/0093766 A1 | 5/2006 | Savicki et al. | |
| 2006/0148915 A1 * | 7/2006 | Floyd et al. | 521/61 |
| 2006/0177161 A1 * | 8/2006 | Turvey | 383/120 |
| 2007/0166503 A1 | 7/2007 | Hannigan | |
| 2007/0254120 A1 * | 11/2007 | Rasmussen | 428/35.7 |
| 2007/0257402 A1 * | 11/2007 | Rasmussen | 264/339 |
| 2008/0031553 A1 * | 2/2008 | Tokita et al. | 383/113 |
| 2008/0124461 A1 | 5/2008 | Leener et al. | |
| 2008/0137995 A1 * | 6/2008 | Fraser et al. | 383/75 |
| 2008/0241769 A1 * | 10/2008 | Quintens et al. | 430/349 |
| 2009/0003736 A1 * | 1/2009 | Alipour et al. | 383/42 |
| 2009/0029114 A1 | 1/2009 | Cancio et al. | |
| 2009/0068427 A1 * | 3/2009 | Patel et al. | 428/212 |
| 2009/0233041 A1 * | 9/2009 | Rasmussen | 428/101 |
| 2009/0264847 A1 * | 10/2009 | Ashton et al. | 604/367 |
| 2010/0040875 A1 * | 2/2010 | Patel et al. | 428/338 |
| 2010/0046860 A1 * | 2/2010 | Kent et al. | 383/75 |
| 2010/0046861 A1 * | 2/2010 | Wilcoxen | 383/119 |
| 2010/0098354 A1 * | 4/2010 | Fraser et al. | 383/72 |
| 2010/0195937 A1 * | 8/2010 | Fraser et al. | 383/105 |
| 2011/0052104 A1 * | 3/2011 | Wilcoxen et al. | 383/75 |
| 2011/0052105 A1 * | 3/2011 | Wilcoxen et al. | 383/75 |
| 2011/0117307 A1 * | 5/2011 | Fraser et al. | 428/66.6 |
| 2011/0255809 A1 * | 10/2011 | Tucker et al. | 383/119 |
| 2011/0317945 A1 * | 12/2011 | Waldron et al. | 383/119 |
| 2012/0033900 A1 * | 2/2012 | Fraser et al. | 383/105 |
| 2012/0039550 A1 * | 2/2012 | MacPherson et al. | 383/109 |
| 2012/0057811 A1 * | 3/2012 | Tucker et al. | 383/72 |
| 2012/0063706 A1 * | 3/2012 | Fraser et al. | 383/109 |
| 2013/0202853 A1 * | 8/2013 | Bergman et al. | 428/167 |
| 2013/0209711 A1 * | 8/2013 | Borchardt et al. | 428/34.8 |
| 2013/0209712 A1 * | 8/2013 | Borchardt et al. | 428/34.8 |

* cited by examiner

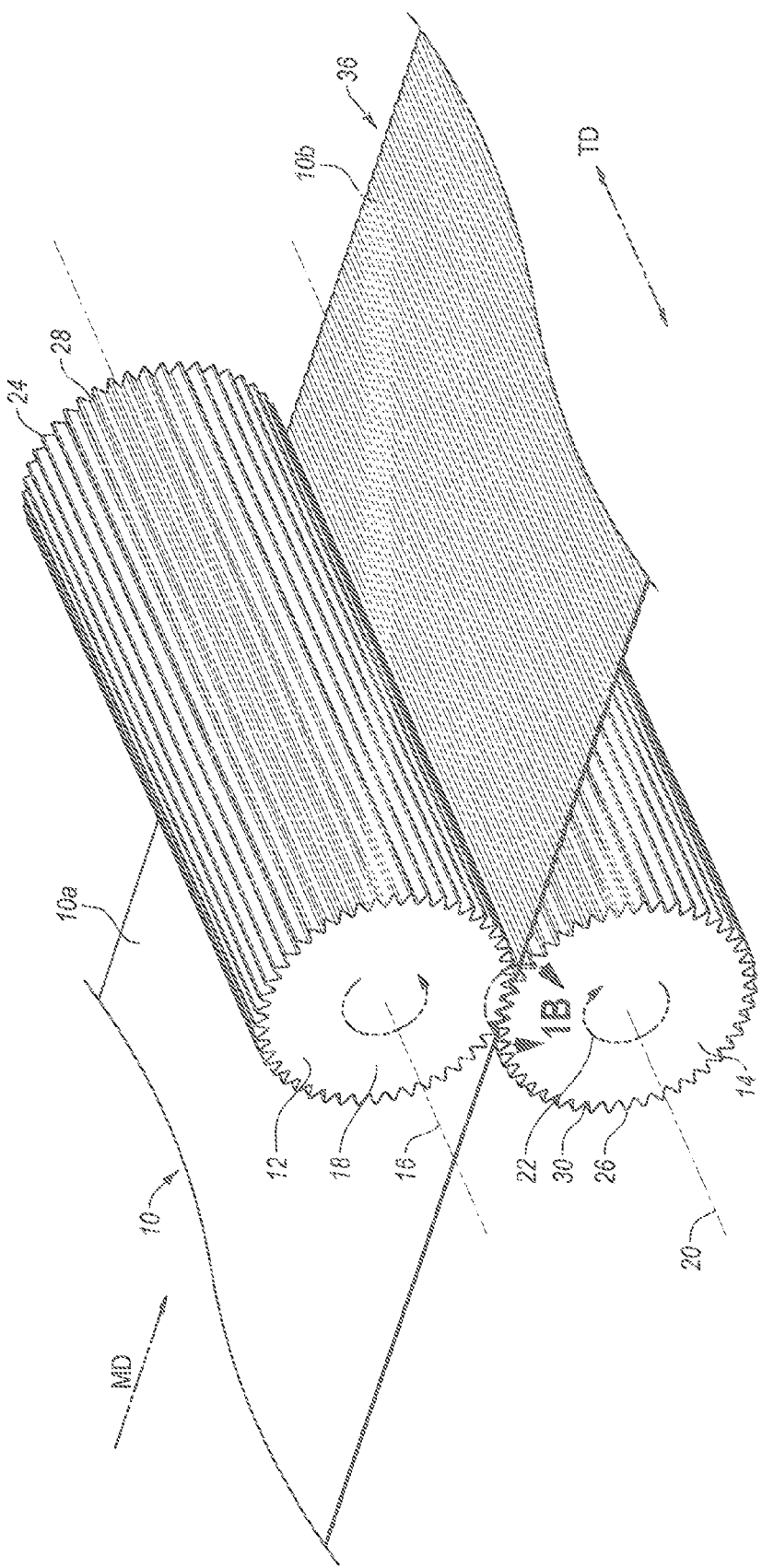

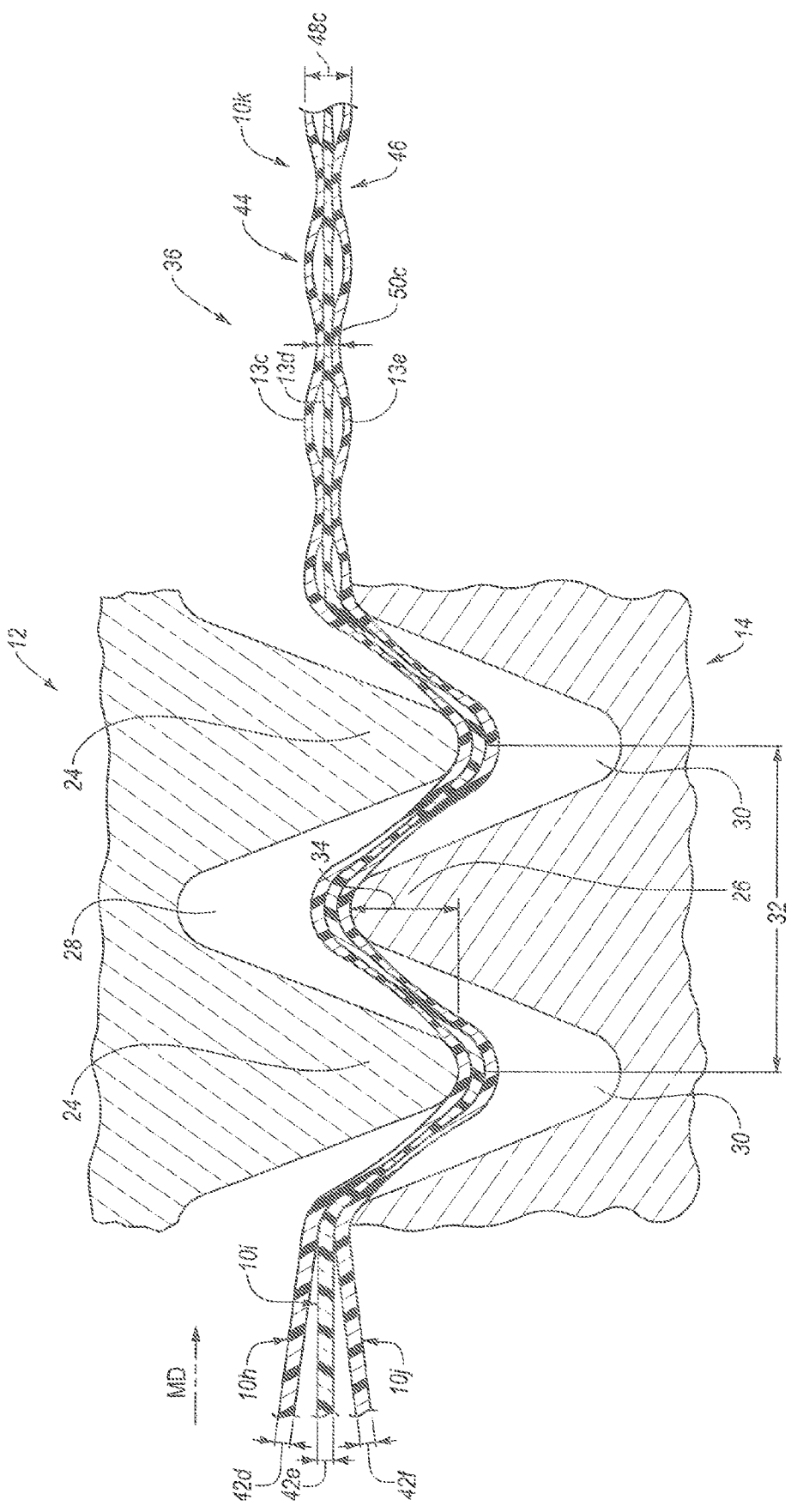

MULTI-LAYERED FILMS WITH VISUALLY-DISTINCT REGIONS AND METHODS OF MAKING THE SAME

CROSS-REFERENCE TO RELATED APPLICATIONS

This application claims the benefit of U.S. Provisional Application No. 61478,643, filed Apr. 25, 2011, which is hereby incorporated by reference in its entirety.

BACKGROUND OF THE INVENTION

1. The Field of the Invention

The present invention relates generally to thermoplastic films. Specifically, the invention relates to stretched thermoplastic films with visually distinct regions created by stretching the films.

2. Background and Relevant Art

Thermoplastic films are a common component in various commercial and consumer products. For example, grocery bags, trash bags, sacks, and packaging materials are products that are commonly made from thermoplastic films. Additionally, feminine hygiene products, baby diapers, adult incontinence products, and many other products include thermoplastic films to one extent or another.

Thermoplastic films have a variety of different strength parameters that manufacturers of products incorporating a thermoplastic film component may attempt to manipulate to ensure that the film is suitable for use its intended use. For example, manufacturers may attempt to increase or otherwise control the tensile strength, tear resistance, impact resistance, and breathability of a thermoplastic film. One way manufacturers may attempt to control or change the material properties of a thermoplastic film is by stretching the film. Common directions of stretching include "machine direction" and "transverse direction" stretching. As used herein, the term "machine direction" or "MD" refers to the direction along the length of the film, or in other words, the direction of the film as the film is formed during extrusion and/or coating. As used herein, the term "transverse direction" or "TD" refers to the direction across the film or perpendicular to the machine direction.

Common ways of stretching film in the machine direction include machine direction orientation ("MDO") and incremental stretching. MDO involves stretching the film between two pairs of smooth rollers. Commonly MDO involves running a film through the nips of sequential pairs of smooth rollers. The first pair of rollers rotates at a speed less than that of the second pair of rollers. The difference in speed of rotation of the pairs of rollers can cause the film between the pairs of rollers to stretch. The ratio of the roller speeds will roughly determine the amount that the film is stretched. For example, if the first pair of rollers is rotating at 100 feet per minute ("fpm") and the second pair of rollers is rotating at 500 fpm, the rollers will stretch the film to roughly five times its original length. MDO stretches the film continuously in the machine direction and is often used to create an oriented film.

Incremental stretching of thermoplastic film, on the other hand, typically involves running the film between grooved or toothed rollers. The grooves or teeth on the rollers intermesh and stretch the film as the film passes between the rollers. Incremental stretching can stretch a film in many small increments that are spaced across the film. The depth at which the intermeshing teeth engage can control the degree of stretching. Often, incremental stretching of films is referred to as ring rolling.

In connection with stretching a film, manufacturers may add a voiding agent to the film. Upon stretching, the voiding agent can create voids in the film; thereby, producing a breathable film. Manufacturers commonly use relatively large amounts of filler (50% by weight) and/or heat the film to an elevated temperature during stretching when creating breathable or porous films.

In addition to allowing for the modification or tailoring of the strength and the breathability of a film, stretching of a film can also reduce the thickness of the film. Stretched films of reduced thickness can allow manufacturers to use less thermoplastic material to form a product of a given surface area or size. Reducing the gauge of a film; however, can make the film more transparent or translucent. Consumers commonly associate thinner films and/or transparent films with weakness; and thus, may be dissuaded to purchase stretched films. Manufacturers may add pigments, such as $TiO_2$, to add either color or opacity to thinner films. Unfortunately, additives, such as $TiO_2$ can be expensive and often negatively impact the film strength properties, especially as the additive concentration is increased. Furthermore, even pigmented films commonly become less opaque upon stretching.

One common use of thermoplastic films is as bags for liners in trash or refuse receptacles. It is often undesirable to use porous or breathable films in trash bags as the voids in porous films may allow odor and/or liquids to escape from the bag. Additionally, many consumers may prefer opaque and non-transparent trash bags that prevent others (i.e., neighbors) from viewing the contents in the trash bag.

Another common use of thermoplastic films is as flexible plastic bags for storing food items. Similar to trash bags, in some instances it may be undesirable to use porous or breathable films in food storage bags because the voids in porous films can allow air and/or germs to reach and spoil the food within food storage bag. In other instances, however, a breathable food storage bag may be desirable. For example, a breathable food storage bag may be desirable when storing fruit and/or vegetables.

Accordingly, there are a number of considerations to be made in thermoplastic films and manufacturing methods.

BRIEF SUMMARY OF THE INVENTION

Implementations of the present invention solve one or more problems in the art with apparatus and methods for creating multi-layered films with visually-distinct stretched regions. In particular, one or more implementations of the present invention include incrementally stretching multi-layered thermoplastic films with a voiding agent in one or more of the layers. Upon stretching, the voiding agent can cause the stretched regions of the film to become more opaque than un-stretched regions of the film. Additionally, one or more implementations of the present invention include methods of incrementally-stretching multilayered films to create visually-distinct stretched regions.

For example, one implementation of a multi-layered thermoplastic film includes a first film layer and a second film layer. The multi-layered thermoplastic film also includes a plurality of un-stretched regions formed in the first and second film layers. The un-stretched regions can have a first average thickness. The multi-layered thermoplastic film further includes a plurality of stretched regions intermittently dispersed about the plurality of un-stretched regions. The stretched regions can have a second average thickness that is smaller than the first average thickness. Additionally, the stretched regions are more opaque than the un-stretched regions.

Additionally, one or more implementations of the present invention include a thermoplastic bag having first and second sidewalls formed from a plurality of film layers. At least one film layer of the plurality of film layers can comprise a thermoplastic material and a voiding agent. The thermoplastic bag also includes a plurality of un-stretched regions formed in one or more of the first sidewall or the second sidewall and a plurality of stretched regions intermittently dispersed about the un-stretched regions. The stretched regions of the at least one film layer can be more opaque than the un-stretched regions of the at least one film layer.

In addition to the forgoing, a method for incrementally stretching a film to create visually distinct regions can involve providing a first film layer comprising a thermoplastic material and a voiding agent and providing at least a second film layer. The method can also involve incrementally cold stretching the first film layer and at least a second film layer to create stretched regions intermittingly dispersed among un-stretched regions. The stretched regions of at least the first film layer can be more opaque than the un-stretched regions of the first film layer.

Additional features and advantages of exemplary embodiments of the present invention will be set forth in the description which follows, and in part will be obvious from the description, or may be learned by the practice of such exemplary embodiments. The features and advantages of such embodiments may be realized and obtained by means of the instruments and combinations particularly pointed out in the appended claims. These and other features will become more fully apparent from the following description and appended claims, or may be learned by the practice of such exemplary embodiments as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. It should be noted that the figures are not drawn to scale, and that elements of similar structure or function are generally represented by like reference numerals for illustrative purposes throughout the figures. Understanding that these drawings depict only typical embodiments of the invention and are not therefore to be considered to be limiting of its scope, the invention will be described and explained with additional specificity and detail through the use of the accompanying drawings in which:

FIG. 1A illustrates a schematic diagram of a multi-layered thermoplastic film being incrementally stretched by MD intermeshing rollers in accordance with one or more implementations of the present invention;

FIG. 1E illustrates an enlarged view of three separate thermoplastic films passing together through the intermeshing rollers of FIG. 1A to form a discontinuously laminated film;

DETAILED DESCRIPTION OF THE PREFERRED EMBODIMENTS

Figure 1B:
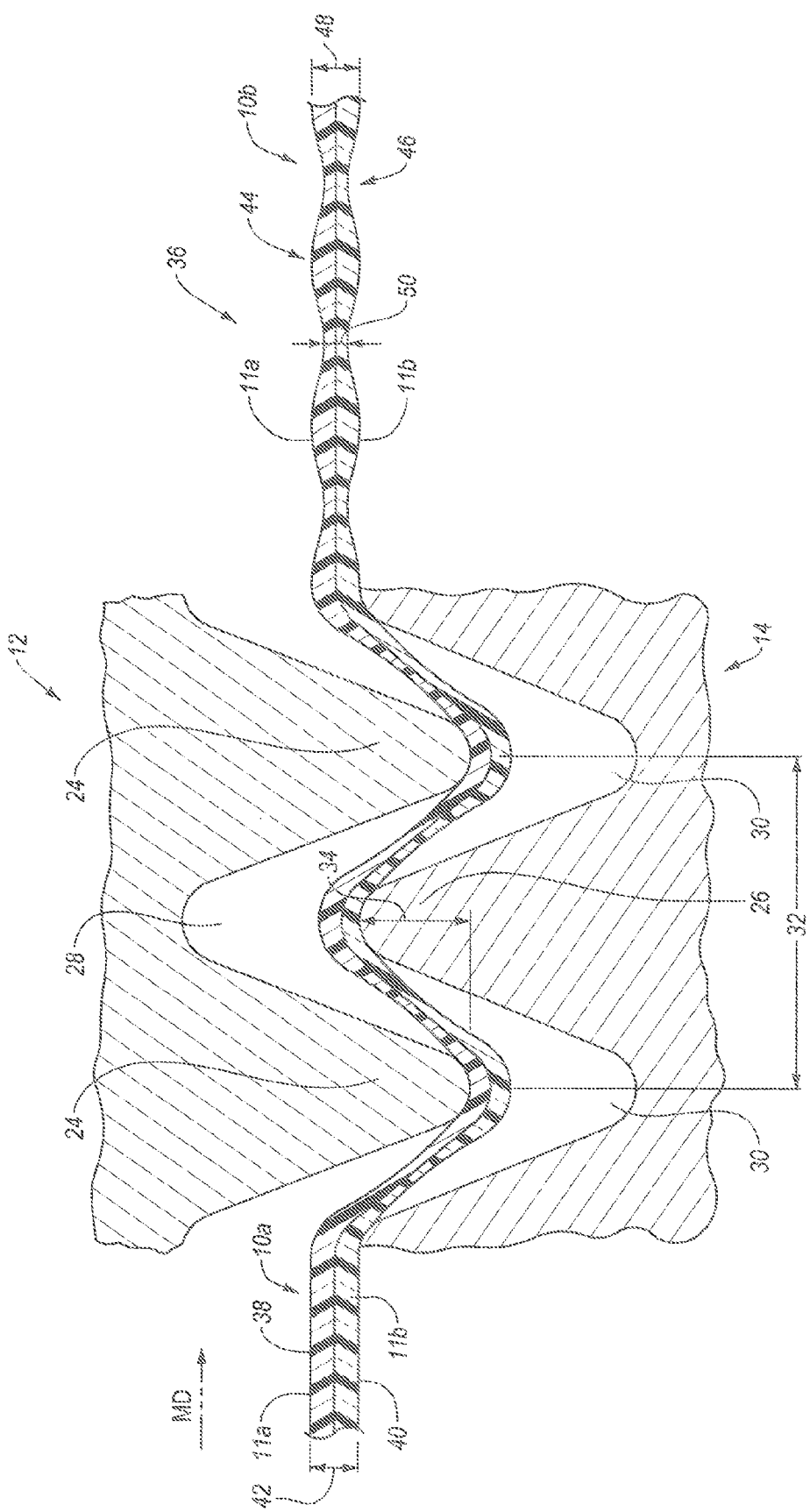
FIG. 1B illustrates an enlarged view of a portion of the multi-layered thermoplastic film passing through the intermeshing rollers of FIG. 1A taken along the circle 1B of FIG. 1.

One or more implementations of the present invention include apparatus and methods for creating multi-layered films with visually-distinct stretched regions. In particular, one or more implementations of the present invention include incrementally stretching multi-layered thermoplastic films with a voiding agent in one or more of the layers. Upon stretching, the voiding agent can cause the stretched regions of the film to become more opaque than un-stretched regions of the film. Additionally, one or more implementations of the present invention include methods of incrementally-stretching multilayered films to create visually-distinct stretched regions.

Indeed, one or more implementations of the present invention can provide multi-layered thermoplastic films, and products made there from, with visually-distinct stretched regions. As used herein, the term "visually distinct" refers to a feature that is more opaque and potentially a different color from another feature in a manner that is visible to the naked eye. In one or more implementations, the visually-distinct stretched regions can be white and opaque. The opacity of the visually-distinct stretched regions can make the stretched regions appear thick and can connote strength to a consumer.

In addition to the foregoing, one or more implementations provide stretched multi-layered thermoplastic films with visually distinct regions that consumers can associate with improved properties created by stretching the film. For example, the visually distinct regions can indicate that those regions have undergone a transformation to impart a desirable characteristic to that region (e.g., increased strength or elasticity). Thus, the visually distinct regions can serve to notify a consumer that the multi-layered thermoplastic film has been processed to improve the film.

Furthermore, different areas of a multi-layered film can include different types of stretching; and thus, different strength characteristics. The different visually-distinct stretched regions created by the different types of stretching can serve to notify the consumer that the different areas or zones of the film have been tailored with different characteristics. For example, one or more implementations of the present invention includes using MD ring rolling, TD ring rolling, diagonal direction ("DD") ring rolling, and the formation of strainable networks, and combinations thereof to create different stress-whitened patterns in a film. As used herein, "stress-whitening" or "stress-whitened" refers to a film becoming more opaque and/or whiter upon stretching. In addition to different types of stretching, intermeshing rollers with different tooth pitches and/or layouts can allow for the creation of visually-distinct stress-whitened patterns in a multi-layered film. Also, the multi-layered film can include one or more pigments of a color other than white. Thus upon stretching, the whitened stretched regions can contrast with the colored un-stretched regions.

In addition to the foregoing, the various layers of the multi-layered films can have different pigments, voiding agents, stretch patterns, and/or transparency to provide various different visually pleasing aesthetics. For example, in one or more implementations the all of the layers of the multi-layered film can include a voiding agent. In other implementations, some but not all of the layers of the multi-layered film can include a voiding agent.

In particular, in one or more implementations a center layer may include a color pigment, while the outer layers are un-pigmented but include a voiding agent. Upon stretching, the color of the pigment may be visible in the un-stretched regions of the film, while the visually-distinct stretched areas may appear white and opaque and hide the pigmented inner layer. In alternative implementations, the outer layers of a multi-layered film can include a color pigment but no voiding agent, while the inner layer(s) may include a voiding agent. Upon stretching, the color of the pigment may be visible in the un-stretched regions of the film, while the visually-distinct stretched areas may more as a lighter shade of the color due to the white and opaque regions under the pigmented outer layer. Thus, one will appreciate in light of the disclosure herein that one or more multi-layered films of the present invention can include a wide variety of different visual effects by varying pigments, voiding agents, stretch patterns, and/or transparency of the various layers of the film.

In addition to the foregoing, in one or more implementations a manufacturer can include the voiding agent in the outer layers of a multi-layered film to increase the visually effects created by stress whitening. Furthermore, a manufacturer may vary the ratios of the thickness of the various layers of multi-layered film to provide the greatest visual impact. For example, in one or more implementations the layer(s) of the film including the voiding agent may be thicker than the other layer(s). Additionally, or alternatively, the layer(s) without a voiding agent can be thicker than the layer(s) with a voiding agent.

Consumers may associate thinner films with decreased strength. Indeed, such consumers may feel that they are receiving less value for their money when purchasing thermoplastic film products with thinner gauges. One will appreciate in light of the disclosure herein that a consumer may not readily detect that one or more incrementally-stretched multi-layered films of the present invention have a reduced gauge. In particular, by imparting an alternating pattern of visually distinct regions, the consumer may perceive the stretched, more opaque, regions as being thicker and/or having increased strength.

As explained in greater detail below, the use of a voiding agent to create visually-distinct stretched regions can allow a manufacturer to use less pigments, such as $TiO_2$, to color or add opacity to a film. The reduction in pigments can lead to significant cost savings. Furthermore, pigments can become less effective as a film is stretched; thus, one or more implementations of the implementations of the present invention can be more effective in adding opacity to stretched films than pigments alone. Thus, the use of a voiding agent in one or more layers of a multi-layered film may allow for the use of less pigment in one or more layers of the film, without compromising on opacity.

As alluded to previously, voiding agents are commonly added to films so as to create porous or breathable films upon stretching. One or more implementations include adding relatively small amounts of a voiding agent(s) and/or stretching the film under ambient or cold (non-heated) conditions to allow for the creation of stress-whitened regions without creating a porous film. This differs significantly from most conventional processes that stretch films including voiding agents. In particular, most conventional processes that stretch films including voiding agents stretch the films under heated conditions and include relatively large amounts of the voiding agent. Stretching under ambient or cold conditions in accordance with one or more implementations can constrain the molecules in the film so they are not as easily oriented as under heated conditions, so as to help prevent the creation of a porous film.

In yet additional implementations, some but not all of the layers of a multi-layered film may include a voiding agent. Such layers may become porous upon stretching as the film is stress-whitened, depending upon the amount of voiding agent and the degree of stretch. The layers without a voiding agent, however, may remain non-porous upon stretching. Thus, the multi-layered film may be non-porous despite one or more porous layers.

Additionally, adding a voiding agent to a film may alter the film's material properties. For example, adding a voiding agent to a film and stretching the film may reduce the film's tensile strength and increase the film's impact resistance. In order to avoid undesirable decreases in certain physical properties and/or increase certain physical properties, one or more implementations of the present invention include multi-layered films with voiding agents in some but not all of the layers. In particular, in one or more implementations only the middle layer(s) of the film may include a voiding agent to provide the least amount of impact to the film's physical properties upon stretching.

Film Materials

As an initial matter, in one or more implementations one or more layers of the films (e.g., 10-10$p$ of FIGS. 1A-9) can comprise a thermoplastic material and a voiding agent. In alternative implementations, one or more layers of the films (e.g., 10-10$p$ of FIGS. 1A-9) may comprise a thermoplastic material(s) that stress whitens without a voiding agent. The thermoplastic material of the films of one or more implementations can include, but are not limited to, thermoplastic polyolefins, including polyethylene and copolymers thereof and polypropylene and copolymers thereof. The olefin based polymers can include the most common ethylene or propylene based polymers such as polyethylene, polypropylene, and copolymers such as ethylene vinylacetate (EVA), ethylene methyl acrylate (EMA) and ethylene acrylic acid (EAA), or blends of such polyolefins.

Other examples of polymers suitable for use as films in accordance with the present invention include elastomeric polymers. Suitable elastomeric polymers may also be biodegradable or environmentally degradable. Suitable elastomeric polymers for the film include poly(ethylene-butene), poly(ethylene-hexene), poly(ethylene-octene), poly(ethylene-propylene), poly(styrene-butadiene-styrene), poly(styrene-isoprene-styrene), poly(styrene-ethylene-butylene-styrene), poly(ester-ether), poly(ether-amide), poly(ethylene-vinylacetate), poly(ethylene-methylacrylate), poly(ethylene-acrylic acid), poly(ethylene butylacrylate), polyurethane, poly(ethylene-propylene-diene), ethylene-propylene rubber.

In at least one implementation of the present invention, the film can include linear low density polyethylene. The term "linear low density polyethylene" (LLDPE) as used herein is defined to mean a copolymer of ethylene and a minor amount of an olefin containing 4 to 10 carbon atoms, having a density of from about 0.910 to about 0.926, and a melt index (MI) of from about 0.5 to about 10. For example, some implementations of the present invention can use an octene comonomer, solution phase LLDPE (MI=1.1; $\rho$=0.920). Additionally, other implementations of the present invention can use a gas phase LLDPE, which is a hexene gas phase LLDPE formulated with slip/AB (MI=1.0; $\rho$=0.920). One will appreciate that the present invention is not limited to LLDPE, and can include "high density polyethylene" (HDPE), "low density polyethylene" (LDPE), and "very low density polyethylene" (VLDPE). Indeed films made from any of the previously mentioned thermoplastic materials or combinations thereof can be suitable for use with the present invention.

LLDPE will typically not stress whiten without a voiding agent. Thus, films of one or more implementations of the present invention including LLDPE may also include a voiding agent. Furthermore, LLDPE is typically not a candidate material for conventional film orientations methods because its relatively high crystallinity can result in a relatively sharp melting point. The relatively sharp melting point can make LLDPE difficult to process. As such, stretching LLDPE by conventional means with voiding agents to create breathable films can be difficult.

Indeed, implementations of the present invention can include any flexible or pliable thermoplastic material which may be formed or drawn into a web or film. Furthermore, the thermoplastic materials may include a single layer or multiple layers. The thermoplastic material may be opaque, transparent, translucent, or tinted. Furthermore, the thermoplastic material may be gas permeable or impermeable.

As used herein, the term "flexible" refers to materials that are capable of being flexed or bent, especially repeatedly, such that they are pliant and yieldable in response to externally applied forces. Accordingly, "flexible" is substantially opposite in meaning to the terms inflexible, rigid, or unyielding. Materials and structures that are flexible, therefore, may be altered in shape and structure to accommodate external forces and to conform to the shape of objects brought into contact with them without losing their integrity. In accordance with further prior art materials, web materials are provided which exhibit an "elastic-like" behavior in the direction of applied strain without the use of added traditional elastic. As used herein, the term "elastic-like" describes the behavior of web materials which when subjected to an applied strain, the web materials extend in the direction of applied strain, and when the applied strain is released the web materials return, to a degree, to their pre-strained condition.

In addition to a thermoplastic material, the films of one or more implementations of the present invention can also include a voiding agent. Some examples of voiding agents suitable for use in the present invention include calcium carbonate, magnesium carbonate, barium carbonate, calcium sulfate, magnesium sulfate, barium sulfate, calcium oxide, magnesium oxide, titanium oxide, zinc oxide, aluminum hydroxide, magnesium hydroxide, talc, clay, silica, alumina, mica, glass powder, starch, etc. One will appreciate in light of the disclosure herein that the foregoing list of voiding agents are examples of some of the voiding agents that may be suitable for use with the present invention.

Films of one or more implementations of the present invention may include other voiding agents, or combinations of any of the previously mentioned voiding agents. Indeed, in one or more implementations, the voiding agent any be any inorganic or organic material with a relatively lower elasticity than the thermoplastic material of the film. In one or more implementations, calcium carbonate may be particularly suitable for its whiteness, inert characteristic, low cost, and availability.

In addition to a thermoplastic material and a voiding agent, films of one or more implementations of the present invention can also include one or more additives. For examples, the films can include pigments, slip agents, anti-block agents, or tackifiers. The pigments can include $TiO_2$, or other pigments, that can impart a color and/or opacity to the film.

One will appreciate in light of the disclosure herein that manufacturers may form the films or webs to be used with the present invention using a wide variety of techniques. For example, a manufacturer can form precursor mix of the thermoplastic material, a voiding agent, and one or more additives. The manufacturer can then form the film(s) from the precursor mix using conventional flat or cast extrusion or coextrusion to produce monolayer, bilayer, or multilayered films. Alternatively, a manufacturer can form the films using suitable processes, such as, a blown film process to produce monolayer, bilayer, or multilayered films. If desired for a given end use, the manufacturer can orient the films by trapped bubble, tenterframe, or other suitable process. Additionally, the manufacturer can optionally anneal the films thereafter.

In one or more implementations, the films of the present invention are blown film, or cast film. Blown film and cast film is formed by extrusion. The extruder used can be a conventional one using a die, which will provide the desired gauge. Some useful extruders are described in U.S. Pat. Nos. 4,814,135; 4,857,600; 5,076,988; 5,153,382; each of which are incorporated herein by reference in their entirety. Examples of various extruders, which can be used in producing the films to be used with the present invention, can be a single screw type modified with a blown film die, an air ring, and continuous take off equipment.

In one or more implementations, a manufacturer can use multiple extruders to supply different melt streams, which a feed block can order into different channels of a multi-channel die. The multiple extruders can allow a manufacturer to form a multi-layered film with layers including different compositions. For example, one or more extruders can supply a melt stream(s) of a thermoplastic material and a voiding agent, while one or more other extruders supply a melt stream (s) of a thermoplastic material without a voiding agent.

In a blown film process, the die can be an upright cylinder with a circular opening. Rollers can pull molten plastic upward away from the die. An air-ring can cool the film as the film travels upwards. An air outlet can force compressed air into the center of the extruded circular profile, creating a bubble. The air can expand the extruded circular cross section by a multiple of the die diameter. This ratio is called the "blow-up ratio." When using a blown film process, the manufacturer can collapse the film to double the plies of the film. Alternatively, the manufacturer can cut and fold the film, or cut and leave the film unfolded.

As used herein, the term "starting gauge" or "initial gauge" refers to the average distance between the major surfaces of a film before it is incrementally stretched. The films of one or more implementations of the present invention can have a starting gauge between about 0.1 mils to about 20 mils, suitably from about 0.2 mils to about 4 mils, suitably in the range of about 0.3 mils to about 2 mils, suitably from about 0.6 mils to about 1.25 mils, suitably from about 0.9 mils to about 1.1 mils, suitably from about 0.3 mils to about 0.7 mils, and suitably from about 0.4 mils and about 0.6 mils. Additionally, the starting gauge of films of one or more implementations of the present invention may not be uniform. Thus, the starting gauge of films of one or more implementations of the present invention may vary along the length and/or width of the film.

In one or more implementations of the present invention, the incrementally-stretched multi-layered films with visually-distinct stretched regions are non porous or non breathable. As used herein, the terms "non porous" and "non breathable" refer to a films that are liquid impermeable and at least substantially gas/vapor impermeable. Thus, a non-porous or non-breathable film may not allow liquids or gases to pass there through. Because the incrementally-stretched multi-layered films with visually-distinct stretched regions of one or more implementations are non porous or non breathable, they may be particularly suited for use in trash liners or food storage bags. In one or more additional implementations, the incrementally-stretched multi-layered films with visually-distinct stretched regions may be liquid impermeable, yet gas/vapor permeable. Such incrementally-stretched multi-layered films with visually-distinct stretched regions of one or more implementations may be particularly suited for use in food storage bags.

It should be noted that the non-porous or non-breathable films of the present invention can include voids. The voids can create the stress-whitened and/or opaque appearance in the stretched regions. One will appreciate, however, that the size, number, and/or depth of the voids may prevent liquid from passing through the film. Furthermore, in some implementations, the size, number, and/or depth of the voids may substantially prevent gases and vapors from passing through the film. In still further implementations, the size, number, and/or depth of the voids may completely prevent gases and vapors from passing through the film.

The size, number, and/or depth of the voids can be controlled to ensure a non-porous film by controlling one or more of the amount of the voiding agent in the film, the degree or amount of stretching, and the temperature of the film upon stretching. For example, in one or more implementations the percent weight of the voiding agent in the film can be suitably between about 1% and about 35%, suitably between about 1% and about 30%, suitably between about 5% and about 25%, suitably between about 5% and about 20%, and suitably between about 10% and about 15%.

Additionally, one or more implementations include incrementally stretching the film under ambient or cold (non-heated) conditions. Furthermore, one or more implementations include stretching the film at ratios less than about 1:3. In other words, one or more implementations include stretching the film less than about 3 times its original dimension (e.g., length, width). Suitably one or more implementations include stretching the film less than about 1.5 times its original dimension (e.g., length, width).

In yet further implementations, one or more layers of an incrementally-stretched films multi-layered film can include one or more layers that are porous and one or more layers that are non-porous. The porous layer(s) may comprise voids created by a voiding agent within the layer. The voids may be significantly large enough to allow gases and/or liquids to pass through the layer. The non-porous layer(s) of the incrementally-stretched films multi-layered film; however, and prevent the film from being porous despite the presence of one or more porous layers.

Referring now to the Figures, FIGS. 1A-1E illustrate exemplary processes of incrementally stretching a thermoplastic film to create visually-distinct stretched regions in accordance with an implementation of the present invention. In particular, FIGS. 1A-1E illustrate an MD ring rolling process that incrementally stretches thermoplastic multi-layered films 10 by passing the multi-layered films 10 through a pair of MD intermeshing rollers 12, 14. The MD ring rolling processes of the present invention can stretch the multi-layered films 10 in the machine direction.

As shown by the FIGS. 1A-1E, the first roller 12 and the second roller 14 can each have a generally cylindrical shape. The rollers 12, 14 may be made of cast and/or machined metal, such as, steel, aluminum, or any other suitable material. The rollers 12, 14 can rotate in opposite direction about parallel axes of rotation. For example, FIG. 1A illustrates that the first roller 12 can rotate about a first axis 16 of rotation in a counterclockwise direction 18. FIG. 1A also illustrates that the second roller 14 can rotate about a second axis 20 of rotation in a clockwise direction 22. The axes of rotation 16, 20 can be parallel to the transverse direction and perpendicular to the machine direction.

The intermeshing rollers 12, 14 can closely resemble fine pitch spur gears. In particular, the rollers 12, 14 can include a plurality of protruding ridges 24, 26. The ridges 24, 26 can extend along the rollers 12, 14 in a direction generally parallel to axes of rotation 16, 20. Furthermore, the ridges 24, 26 can extend generally radially outward from the axes of rotation 16, 20. The tips of ridges 24, 26 can have a variety of different shapes and configurations. For example, the tips of the ridges 24, 26 can have a rounded shape as shown in FIGS. 1B-1E. In alternative implementations, the tips of the ridges 24, 26 can have sharp angled corners. FIGS. 1A-1E also illustrate that grooves 28, 30 can separate adjacent ridges 24, 26.

The ridges 24 on the first roller 12 can be offset or staggered with respect to the ridges 26 on the second roller 14. Thus, the grooves 28 of the first roller 12 can receive the ridges 26 of the second roller 14, as the rollers 12, 14 intermesh. Similarly, the grooves 30 of the second roller 14 can receive the ridges 24 of the first roller 12. In one or more implementations, the ridges 24, 26 will not contact each other or transmit rotational torque during an intermeshing stretching operation.

One will appreciate in light of the disclosure herein that the configuration of the ridges 24, 26 and grooves 28, 30 can prevent contact between ridges 24, 26 during intermeshing. Additionally, the configuration of the ridges 24, 26 and grooves 28, 30 can dictate the amount stretching a film passing through the MD intermeshing rollers 12, 14 undergoes.

Referring specifically to FIGS. 1B-1E, various features of the ridges 24, 26 and grooves 28, 30 are shown in greater detail. The pitch and depth of engagement of the ridges 24, 26 can determine, at least in part, the amount of incremental stretching created by the intermeshing rollers 12, 14. As shown by FIGS. 1B-1E, the pitch 32 is the distance between the tips of two adjacent ridges on the same roller. The "depth of engagement" (DOE) 34 is the amount of overlap between ridges 24, 26 of the different rollers 12, 14 during intermeshing. The ratio of DOE 34 to pitch 32 can determine, at least in part, the amount of stretch imparted by a pair of intermeshing rollers 12, 14.

As shown by FIG. 1A, the direction of travel of the multi-layered film 10 through the intermeshing rollers 12, 14 is parallel to the machine direction and perpendicular to the transverse direction. As the thermoplastic multi-layered film 10 passes between the intermeshing rollers 12, 14, the ridges 24, 26 can incrementally stretch the multi-layered film 10 in the machine direction. In some implementations, stretching the multi-layered film 10 in the machine direction can reduce the gauge of the film and increase the length of the multi-layered film 10. In other implementations, the multi-layered film 10 may rebound after stretched such that the gauge of the multi-layered film 10 is not decreased. Furthermore, in some implementations, stretching the film 10 in the machine direction can reduce the width of the multi-layered film 10. For example, as the multi-layered film 10 is lengthened in the machine direction, the film's length can be reduced in the transverse direction.

In particular, as the multi-layered film 10 proceeds between the intermeshing rollers 12, 14, the ridges 24 of the first roller 12 can push the multi-layered film 10 into the grooves 30 of the second roller 14 and vice versa. The pulling of the multi-layered film 10 by the ridges 24, 26 can stretch the multi-layered film 10. The rollers 12, 14 may not stretch the multi-layered film 10 evenly along its length. Specifically, the rollers 12, 14 can stretch the portions of the film 10 between the ridges 24, 26 more than the portions of the multi-layered film 10 that do contact the ridges 24, 26. Thus, the rollers 12, 14 can impart or form a striped pattern 36 into the multi-layered film 10. As used herein, the terms "impart" and "form" refer to the creation of a desired structure or geometry in a film upon stretching the film that will at least partially retain the desired structure or geometry when the film is no longer subject to any strains or externally applied forces.

As shown in FIGS. 1A-1E, the striped pattern 36 formed by the MD ring rolling process can be visually perceivable. As used herein, the term "visually perceivable" refers to features that are readily discernible to the normal naked eye. In particular, visually perceivable features can be readily discernible to the normal naked eye when a multi-layered film 10 including the features is subjected to normal use.

In one or more implementations, prior to passing through the intermeshing rollers 12, 14, the multi-layered film 10 may not include a visually perceivable striped pattern. For example, FIGS. 1A-1CB illustrate that the pre-stretched film 10a, 10c (i.e., the film that is yet to pass through the intermeshing rollers 12, 14) can have a substantially flat top surface 38 and substantially flat bottom surface 40. The pre-stretched film 10a, 10c can have an initial thickness or starting gauge 42, 42a extending between its major surfaces (i.e., the top surface 38 and the bottom surface 40). In at least one implementation, the starting gauge 42, 42a can be substantially uniform along the length of the pre-stretched film 10a, 10c.

For purposes of the present invention, the pre-stretched film 10a, 10c need not have an entirely flat top surface 38. Indeed, the top surface 38 can be rough or uneven. Similarly, bottom surface 40 of the pre-stretched film 10a can also be rough or uneven. Further, the starting gauge 42, 42a need not be consistent or uniform throughout the entirety of pre-stretched film 10a. Thus, the starting gauge 42, 42a can vary due to product design, manufacturing defects, tolerances, or other processing issues.

Figure 1C:
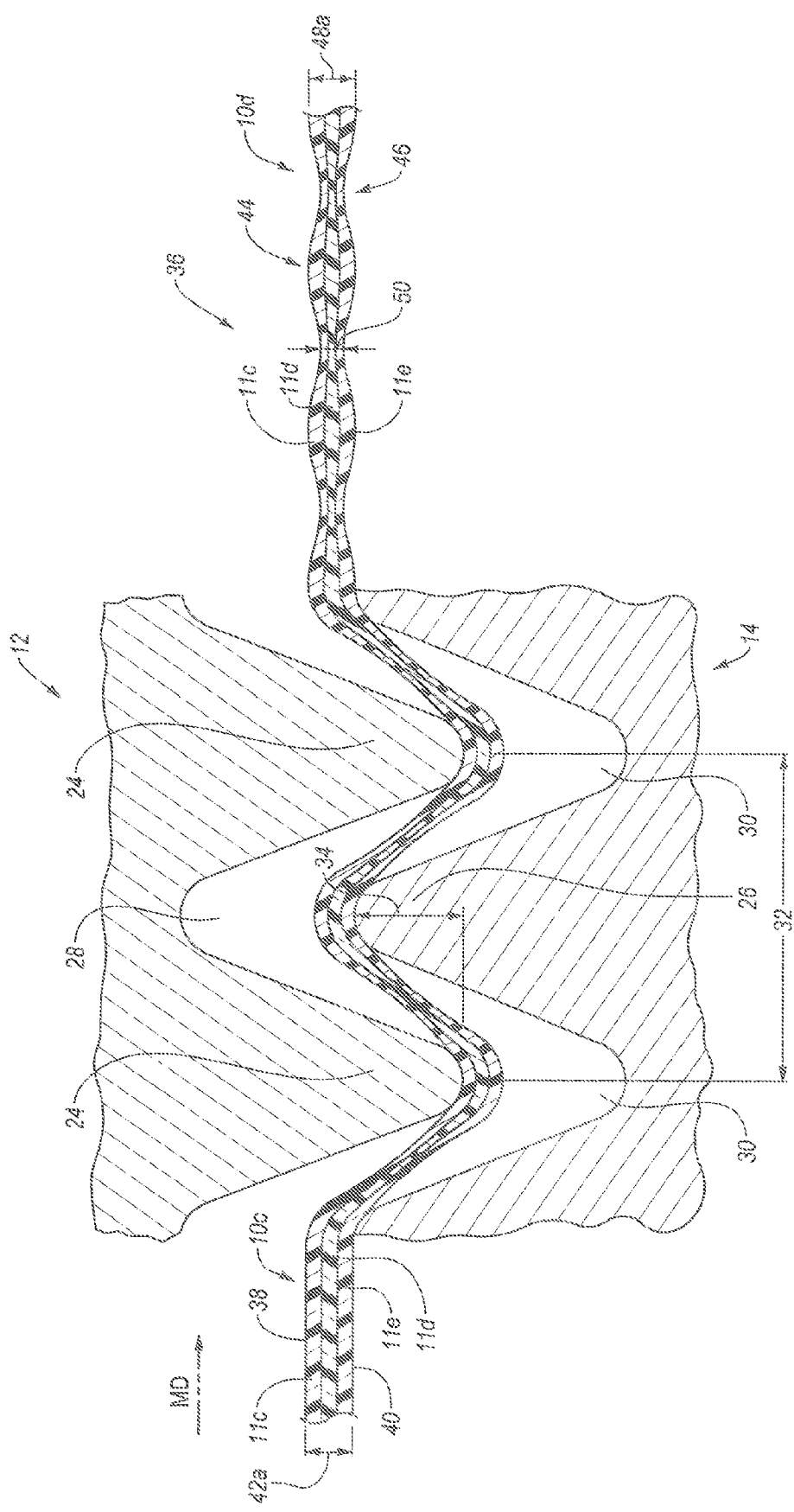
FIG. 1C illustrates an enlarged view of a portion of a tri-layered thermoplastic film passing through the intermeshing rollers of FIG. 1A.

As discussed previously, the pre-stretched film, and thus, the incrementally-stretched film produced there from, can have multiple layers. For instance, FIGS. 1B-1E illustrates that the pre-stretched film can include one or more joined film layers 11a-d or one or more separate film layers 10e-f, 10h-j. For instance, FIGS. 1B and 1C illustrate that pre-stretched films 10a, 10c can each include two or more joined film layers 11a-11d. In particular, FIG. 1B illustrates that the pre-stretched film 10a (and thus the incrementally stretched film 10b) can include a first film layer 11a and a second film layer 11b. FIG. 1C on the other hand illustrates that pre-stretched film 10c (and thus the incrementally stretched film 10d) can include three film layers: a middle film layer 11d, and two outer film layers 11c, 11d. In one or more implementations, the respective film layers 11a-11d of the pre-stretched films 10a, 10b are co-extruded layers. In one or more alternative implementations, the respective film layers 11a-11d of the pre-stretched films 10a, 10b are continuously laminated.

As used herein, the term "lamination," the term "laminate," and the phrase "laminated film," refer to the process, and resulting product, made by bonding together two or more layers of film or other materials. Lamination can be accomplished by joining layers by mechanical pressure, joining layers with adhesives, joining with heat and pressure, and even spread coating and extrusion coating. The term laminate is also inclusive of coextruded multilayer films comprising one or more tie layers. As a verb, "laminate" means to affix or adhere (by means of, for example, adhesive bonding, pressure bonding, ultrasonic bonding, corona lamination, and the like) two or more separately made film articles to one another so as to form a multilayer structure; as a noun, "laminate" means a product produced by the affixing or adhering just described.

FIGS. 1A-1E illustrate the intermeshing rollers 12, 14 can process the pre-stretched multi-layer films 10a, 10c, 10e-f, 10h-j into MD incrementally-stretched films 10b, 10d, 10g, 10k with visually-distinct stretched regions. As previously mentioned, the MD incrementally-stretched multi-layered films 10b, 10d, 10g, 10k can include a striped pattern 36. The striped pattern 36 can include alternating series of "un-stretched" regions 44 and stretched regions 46. In one or more implementations, the "un-stretched" regions of the incrementally-stretched multi-layered films may be stretched to a small degree. In any event, the "un-stretched" regions can be stretched significantly less compared to the stretched regions.

FIGS. 1B and 1C illustrate that the intermeshing rollers 12, 14 can incrementally stretch the pre-stretched films 10a, 10c to create incrementally-stretched multi-layered films 10b,

10*d*. As shown, incrementally-stretched multi-layered films 10*b*, 10*d* can comprise multiple layers 11*a*-11*e* with stretched 46 and un-stretched regions. Similar to the pre-stretched films 10*a*, 10*b*, the incrementally-stretched multi-layered films 10*b*, 10*d* can comprise continuously joined layers.

One will appreciate in light of the disclosure herein that in additional implementations, the pre-stretched films (and thus the incrementally-stretched films) can include more than two or three joined layers. For example, the pre-stretched films (and thus the incrementally-stretched films) can include four, five, six, or more joined layers. Thus, one will appreciate that the present invention is not limited to the depicted and described exemplary implementations.

Figure 1D:
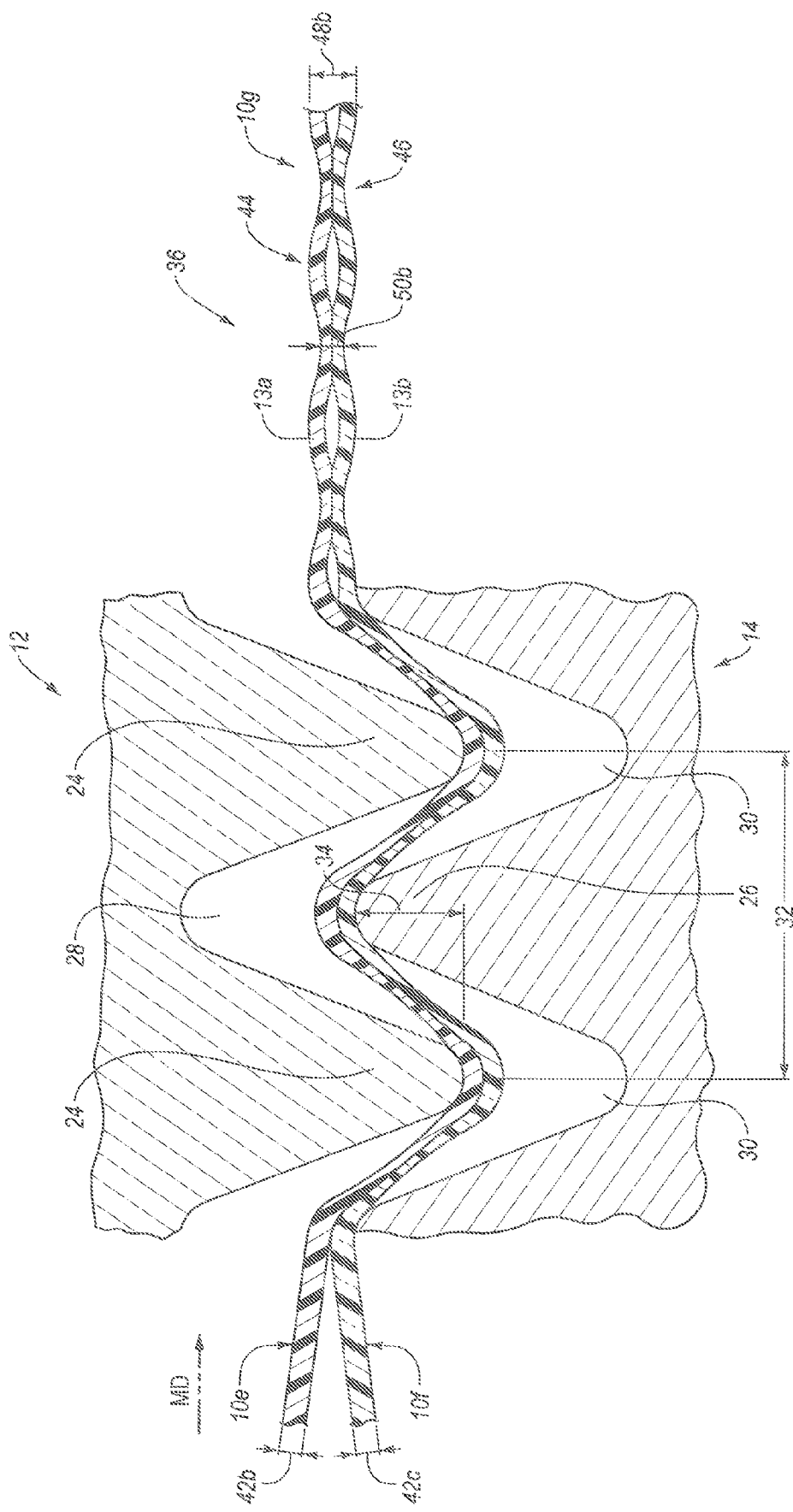
FIG. 1D illustrates an enlarged view of two separate thermoplastic films passing together through the intermeshing rollers of FIG. 1A to form a discontinuously laminated film.

FIGS. 1D and 1E illustrates that in one or more additional implementations the pre-stretched film can include one or more separate film layers 10*e*-*f*, 10*h* j. In particular, FIG. 1D illustrates that the pre-stretched film can include a two separate layers, i.e., a first film layer 10*e* and a second film layer 10*f*. FIG. 1E on the other hand illustrates that pre-stretched film can include three separate film layers: a middle film layer 10*i*, and two outer film layers 10*h*, 10*j*.

FIGS. 1D and 1E illustrate that the intermeshing rollers 12, 14 can incrementally stretch and discontinuously laminate the one or more separate film layers 10*e*-*f*, 10*h*-*j* to create incrementally-stretched multi-layered films 10*g*, 10*k*. As shown, incrementally-stretched multi-layered films 10*g*, 10*k* can include stretched 46 and un-stretched regions 44. Furthermore, the incrementally-stretched multi-layered films 10*g*, 10*k* can comprise multiple film layers 13*a*-13*e* that are discontinuously laminated together.

For example, FIG. 1D illustrates that the film layers 13*a*, 13*b* of the incrementally-stretched multi-layered film 10*g* can be laminated together at the stretched regions 46, while the un-stretched regions 44 may not be laminated together. Similarly, FIG. 1E illustrates that the film layers 13*c*, 13*d*, 13*e* of the incrementally-stretched multi-layered film 10*k* can be laminated together at the stretched regions 46, while the un-stretched regions 44 may not be laminated together.

In one or more implementations, one or more of the separate film layers 10*e*-*f*, 10*h*-*j* can be stretched, incrementally or continuously, prior to being passed through the intermeshing rollers together with the other separate film layers. In particular, one or more of the separate film layers 10*e*-*f*, 10*h*-*j* can be stretched to provide the layer(s) with different film properties than one or more of the other separate film layers, prior to discontinuously laminating the separate film layers together.

In any event, in one or more implementations the different film layers 11*a*-11*e*, 13*a*-13*e* can comprise the same or different compositions. For example, in one or more implementations all of the film layers of a given incrementally-stretched multi-layered film 10*b*, 10*d*, 10*g*, 10*k* can include both a thermoplastic material and a voiding agent. In alternative implementations, one or more, but not all, of the film layers can include both a thermoplastic material and a voiding agent. In yet further implementations all or none of the film layers can include a voiding agent.

In particular, in one or more implementations, the outer layers 11*c*, 11*e*, 13*c*, 13*e*, but not the inner layers 11*d*, 13*d* may include a voiding agent. Including a voiding agent in only the outer layers can to provide the greatest visual impact of the stress whitening. Alternatively, the inner layers 11*d*, 13*d*, but not the outer layers 11*c*, 11*e*, 13*c*, 13*e*, may include a voiding agent. Including a voiding agent in only the inner layers can to provide the least amount of impact to the film's physical properties upon stretching.

In addition to the composition, the different film layers 11*a*-11*e*, 13*a*-13*e* can have differing gauges or thicknesses. For example, the film layer(s) including a voiding agent can be thicker than the layer(s) devoid of voiding agents to increase the opacity of the visually-distinct stretched regions. Alternatively, the film layer(s) devoid of voiding agents can be thicker than the film layers including a voiding agent to increase film strength.

As shown by FIGS. 1B and 1C, the un-stretched regions 44 can have a first average thickness or gauge 48, 48*a*. The first average gauge 48, 48*a* can be approximately equal to the starting gauge 42, 42*a*. In one or more implementations, the first average gauge 48, 48*a* can be less than the starting gauge 42, 42*a*. The stretched regions 46 can have a second average thickness or gauge 50, 50*a*. In one or more implementations, the second average gauge 50, 50*a* can be less than both the starting gauge 42, 42*a* and the first average gauge 48, 48*a*.

Along similar lines, FIGS. 1D and 1E illustrate that the un-stretched regions 44 of the incrementally-stretched multi-layered films 10*g*, 10*k*, can have a first average thickness or gauge 48*b*, 48*c*, respectively. The first average gauge 48*b*, 48*c* can be approximately equal to the combined starting gauges 42*b*-*c*, 42*d*-*f* of the starting films. In one or more implementations, the first average gauge 48*b*, 48*c* can be less than the combined starting gauges 42*b*-*c*, 42*d*-*f*. The stretched regions 46 can have a second average thickness or gauge 50*b*, 50*c*. In one or more implementations, the second average gauge 50*b*, 50*c* can be less than the combined starting gauges 42*b*-*c*, 42*d*-*f* and the first average gauge 48*b*, 48*c*, respectively.

In any event, FIGS. 1A-1E illustrate the intermeshing rollers 12, 14 can process the pre-stretched films into MD incrementally-stretched multi-layered films with visually-distinct stretched regions. As previously mentioned, the MD incrementally-stretched multi-layered films can include a striped pattern 36. The striped pattern 36 can include alternating series of "un-stretched" regions 44 and stretched regions 46. In one or more implementations, the "un-stretched" regions of the incrementally-stretched multi-layered films may be stretched to a small degree. In any event, the "un-stretched" regions are stretched significantly less compared to the stretched regions.

One will appreciate in light of the disclosure herein that the striped pattern 36 may vary depending on the method used to incrementally stretch the film 10. To the extent that MD ring rolling is used to incrementally stretch the film 10, the striped pattern 36 on the film 10 can depend on the pitch 32 of the ridges 24, 26, the DOE 34, and other factors. In some implementations, the molecular structure of the thermoplastic material of the film 10 may be rearranged to provide this shape memory. Furthermore, the location and amount of pigments and/or voiding agents in the various film layers can also affect the visual effects of the stretched 44 and un-stretched regions 46.

Figure 2:
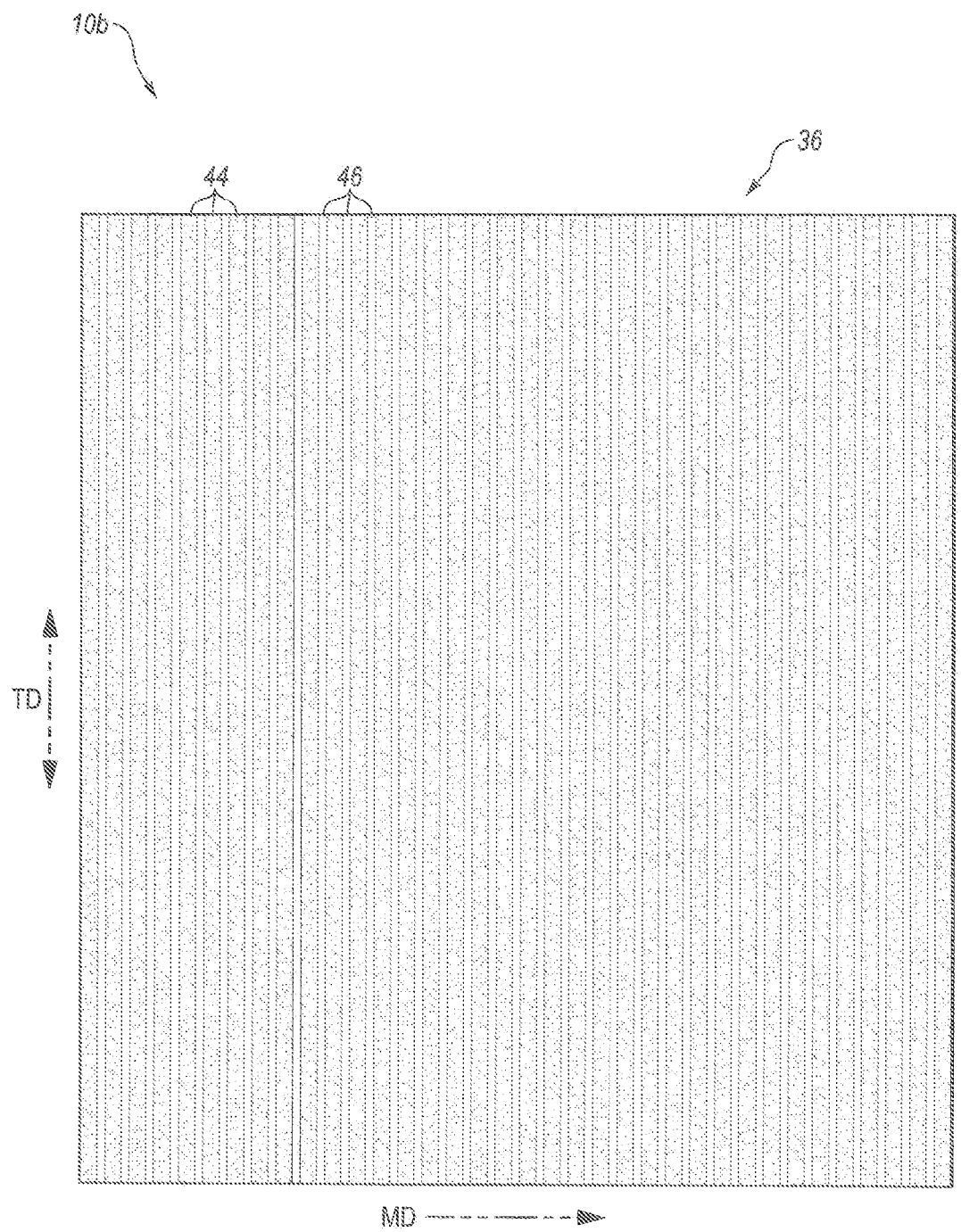
FIG. 2 illustrates a view of a multi-layered thermoplastic film including visually-distinct stretched regions created by the intermeshing rollers of FIG. 1.

FIG. 2 illustrates a top view of the MD incrementally-stretched multi-layered film 10*b* with visually-distinct stretched regions. As shown by FIG. 2, the stretched regions 46 can be white and opaque. The localized stretching of the film 10 in the stretched regions 46 can create voids that provide the stretched regions 46 with whiteness and opacity. In other words, the stretched regions can be stress-whitened. In one or more implementations, the stretched regions 46 are non porous, despite the presence of voids, as previously described herein above.

Additionally, in one or more implementations, despite having a reduced gauge, the stretched regions 46 can be white and opaque. The opacity of the stretched regions 46 can result in a pleasing appearance and connote strength to a consumer. Furthermore, the whiteness and opacity of the stretched regions 46 can signify that the film 10*b* has undergone a transformation to modify one or more characteristics of the film 10b. For example, MD ring rolling the film 10 can increase or otherwise modify one or more of the tensile strength, tear resistance, impact resistance, or elasticity of the film 10b. The visually-distinct stretched regions 46 can signify the transformation to a consumer.

Furthermore, the stretched regions 46 can include stripes that extend across the film 10b in a direction transverse (i.e., transverse direction) to a direction in which the film was extruded (i.e., machine direction). As shown by FIG. 2, the stripes or stretched regions 46 can extend across the entire length of the film 10b. The pitch 32 and the DOE 34 of the ridges 24, 26 of the intermeshing rollers 12, 14 can determine the width and spacing of the stripes or stretched regions 46. Thus, as explained in greater detail below, by varying the pitch 32 and/or DOE 34, the width and/or spacing of the stretched regions 46 can be varied.

FIG. 2 further illustrates that the stretched regions 46 can be intermittently dispersed about un-stretched regions 44. In particular, each stretched region 46 can reside between adjacent un-stretched regions 44. Additionally, the stretched regions 46 can be visually distinct from the un-stretched regions 44. For example, the stretched regions 46 can differ from the un-stretched regions 44 in one or more of color or transparency.

Thus, the un-stretched regions 44 can be a color other than white and/or transparent or translucent. For instance, the un-stretched regions 44 can be black, blue, red, another color, or any shade there between. Thus, in one or more implementations, the stretched regions 46 can be a lighter shade with increased opacity and the un-stretched regions 44 can be either (i) white and transparent or translucent, (ii) a color other than white and transparent or translucent, or (ii) a color other than white and opaque.

Furthermore, the opacity and color of the visually-distinct stretched regions 46 can vary based on the degree of stretching. For instance, when the un-stretched regions 44 are red, the stretched regions 46 can be a lighter shade of red, pink, or even white, along the spectrum of stretch. When the un-stretched regions 44 are black, the stretched regions 46 can be a lighter shade of black, grey, and even white, depending on the degree of stretch. Similar to the shade or color, the opacity of the stretched regions 46 can vary based on the degree of stretching.

In addition to the foregoing, as previously mentioned, the location of the voiding agent and any pigments can further vary the aesthetics of the visually distinct-stretched regions 46 and the un-stretched regions 46. For example, in an incrementally-stretched films with two layers (e.g., FIGS. 1B and 1D), if a voiding agent is in the top film layer (e.g., 11a or 13a), and the bottom film layer e.g., 11b, 13b) includes no voiding agent and a contrasting pigment, the visually distinct-stretched regions 46 can appear white, while the un-stretched regions appear the color of the pigment. If the location of the voiding agent and pigment is switched, the un-stretched regions 44 can appear the color of the pigment, while the visually distinct-stretched regions 46 can appear as a lighter shade of the color of the pigment.

Along similar lines, in an incrementally-stretched films with three layers (e.g., FIGS. 1C and 1e), if a voiding agent is in the outer film layers (e.g., 11c, 11e, or 13c, 13e), and the center film layer e.g., 11d, 13d) includes no voiding agent and a contrasting pigment, the visually distinct-stretched regions 46 can appear white, while the un-stretched regions appear the color of the pigment. If the location of the voiding agent and pigment is switched, the un-stretched regions 44 can appear the color of the pigment, while the visually distinct-stretched regions 46 can appear as a lighter shade of the color of the pigment. One will appreciate in light of the disclosure herein that a manufacturer can similarly vary the location of pigments and voiding agents in the various layers of the incrementally-stretched films 10l-10p described herein below.

The striped pattern 36 may vary depending on the method used to incrementally stretch the film 10. To the extent that MD ring rolling is used to incrementally stretch the film 10, the striped pattern 36 on the film 10 can depend on the pitch 32 of the ridges 24, 26, the DOE 34, and other factors. In some implementations, the molecular structure of the thermoplastic material of the film multi-layered 10 may be rearranged to provide this shape memory.

Figure 3:
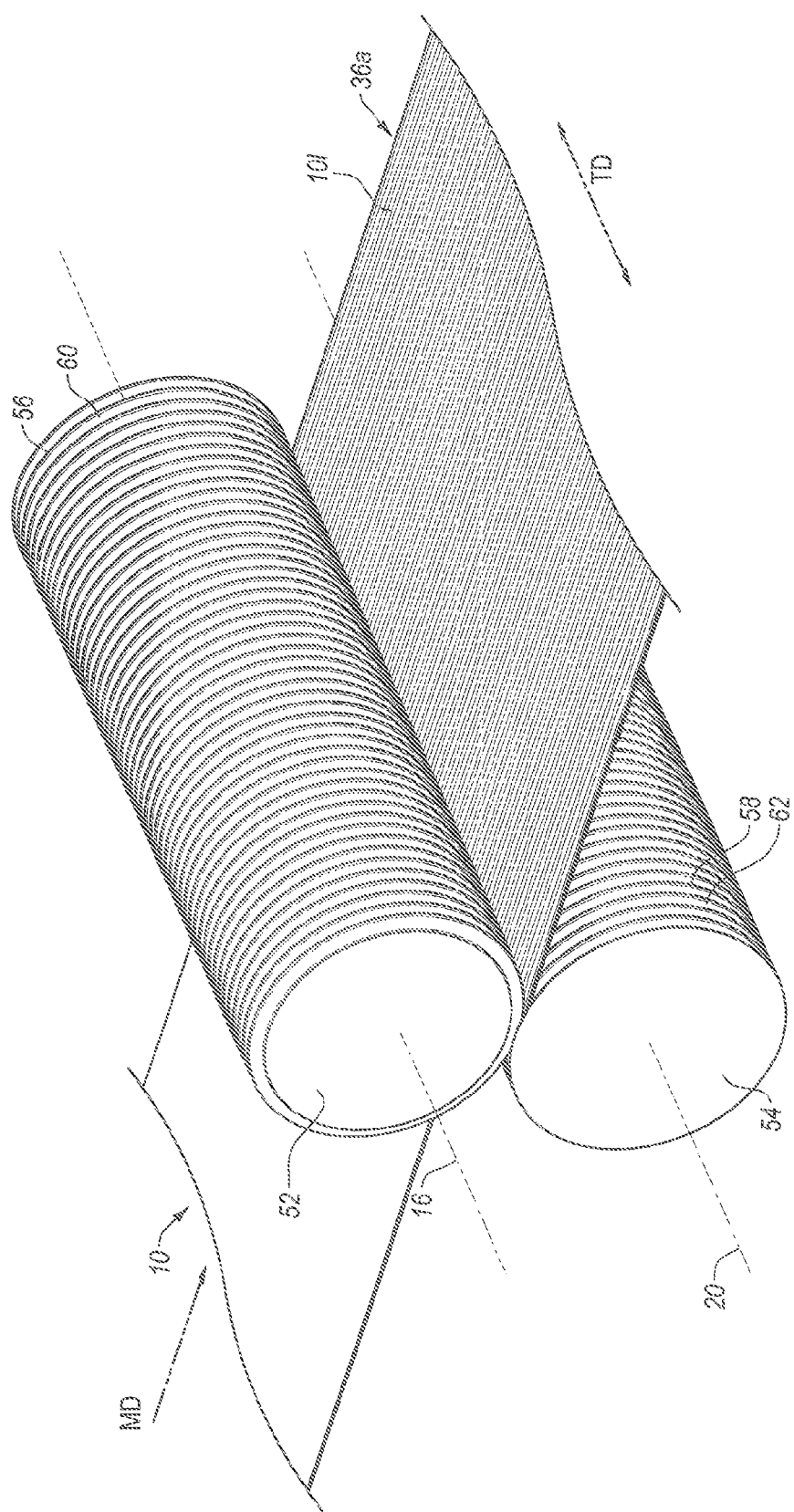
FIG. 3 illustrates a schematic diagram of a multi-layered thermoplastic film being incrementally stretched by TD intermeshing rollers in accordance with one or more implementations of the present invention.

As mentioned previously, MD ring rolling is one exemplary method of incrementally stretching a thermoplastic film to create visually-distinct stretched regions in accordance with an implementation of the present invention. TD ring rolling is another suitable method of incrementally stretching a film to create visually-distinct stretched regions. For example, FIG. 3 illustrates a TD ring rolling process that incrementally stretches a thermoplastic film 10 by passing the film 10 through a pair of TD intermeshing rollers 52, 54. A TD ring rolling processes (and associated TD intermeshing rollers 52, 54) can be similar to the MD ring rolling process (and associated MD intermeshing rollers 12, 14) described herein above, albeit that the ridges 56, 58 and grooves 60, 62 of the TD intermeshing rollers 52, 54 can extend generally orthogonally to the axes of rotation 16, 20.

Thus, as shown by FIG. 3, as the thermoplastic film 10 passes between the intermeshing rollers 52, 54, the ridges 56, 58 can incrementally stretch the film 10 in the transverse direction. In particular, as the film 10 proceeds between the intermeshing rollers 52, 54, the ridges 56, 58 can impart or form a striped pattern 36a into the film 10 to form a TD incrementally-stretched film 10c with visually-distinct stretched regions.

Figure 4:
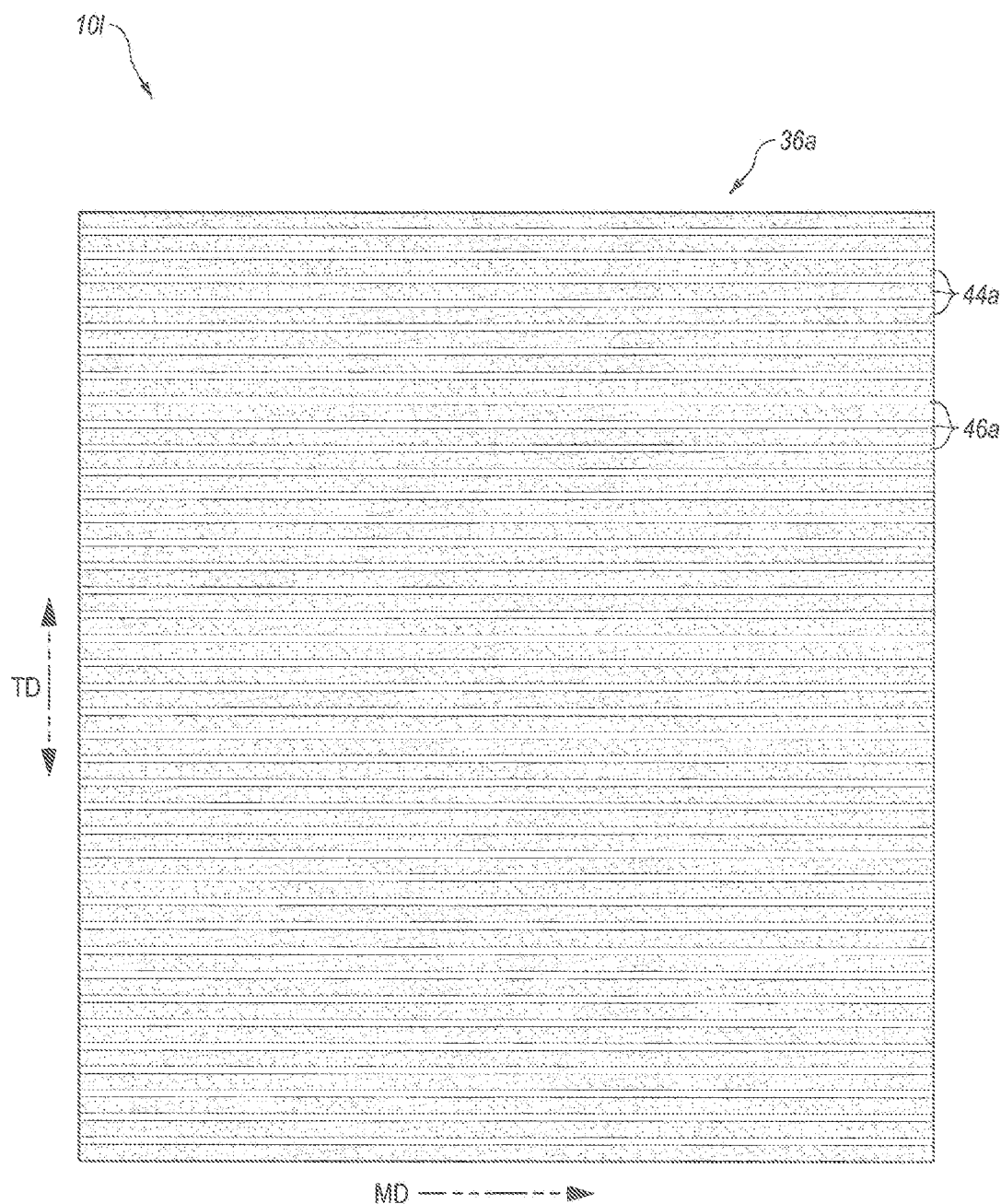
FIG. 4 illustrates a view of a multi-layered thermoplastic film including visually-distinct stretched regions created by the intermeshing rollers of FIG. 3.

FIG. 4 illustrates a view of the TD incrementally-stretched multi-layered film 10l with visually-distinct stretched regions. The striped pattern 36a can include alternating series of un-stretched regions 44a and stretched regions 46a. As shown by FIG. 4, the stretched regions 46a can be white and opaque. The localized stretching of the film 10 in the stretched regions 46a can create voids that provide the stretched regions 46a with whiteness and opacity. In one or more implementations, the stretched regions 46a are non porous, despite the presence of voids, as previously described herein above.

The opacity of the stretched regions 46a can result in a pleasing appearance and connote strength to a consumer. Furthermore, the whiteness and opacity of the stretched regions 46a can signify that the multi-layered film 10l has undergone a transformation to modify one or more characteristics of the multi-layered film 10l. For example, TD ring rolling the multi-layered film 10 can increase or otherwise modify one or more of the tensile strength, tear resistance, impact resistance, or elasticity of the multi-layered film 10l. The visually-distinct stretched regions 46a can signify the transformation to a consumer.

FIG. 4 illustrates that the stretched regions 46a can include stripes that extend across the multi-layered film 10c in the machine direction. As shown by FIG. 4, the stripes or stretched regions 46a can extend across the entire width of the multi-layered film 10l. In alternative implementations, stretched regions 46a can extend across only a portion of the multi-layered film 10l. Similar to MD ring rolling, the pitch and the DOE of the ridges 56, 58 of the intermeshing rollers 52, 54 can determine the width and spacing of the stripes or stretched regions 46a.

Figure 5:
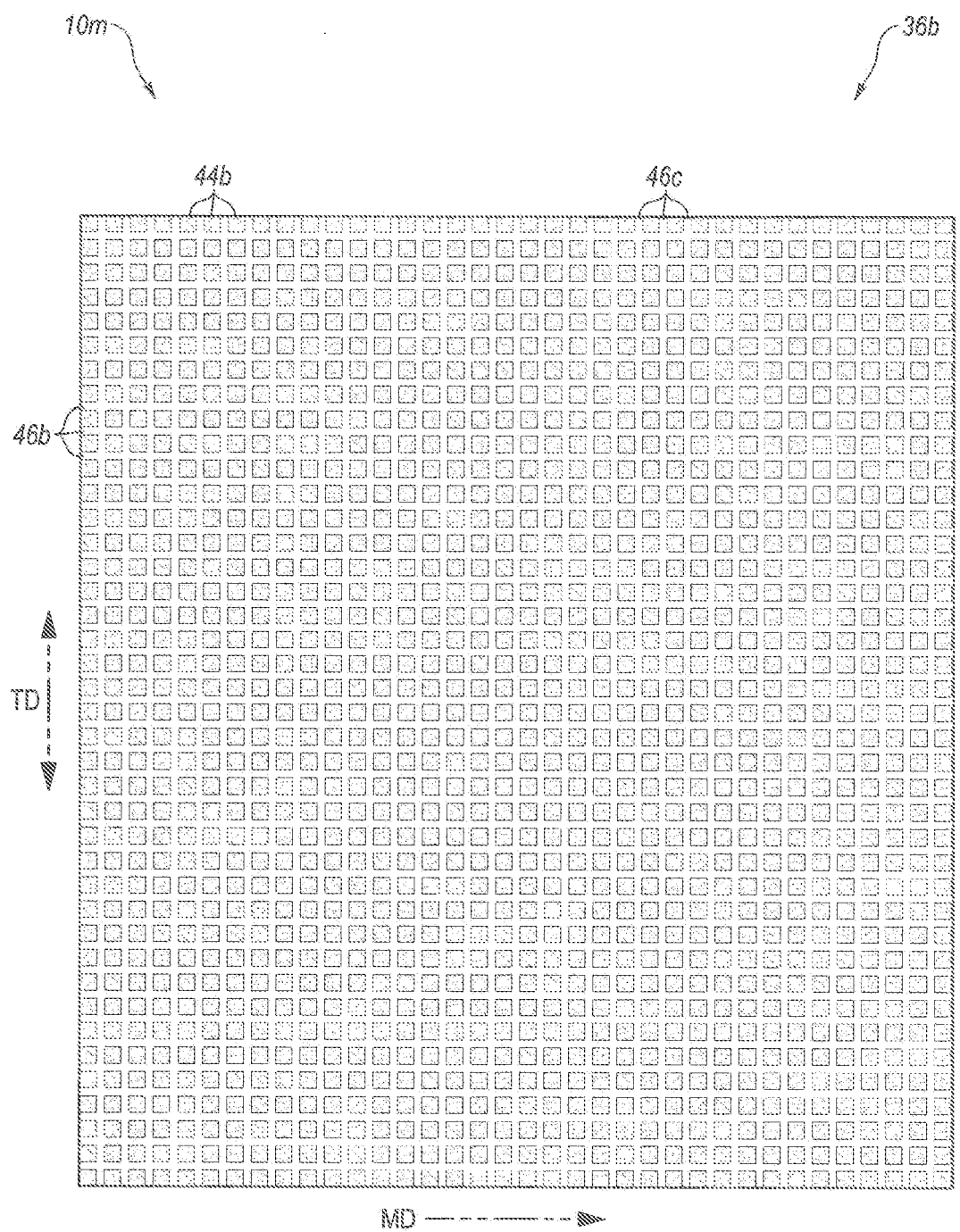
FIG. 5 illustrates a view of a multi-layered thermoplastic film including visually-distinct stretched regions created by the intermeshing rollers of both FIG. 1 and FIG. 3.

In still further implementations, a multi-layered film 10 can undergo both an MD ring rolling process and a TD ring rolling process to create visually-distinct stretched regions. For example, FIG. 5 illustrates a top view of an incrementally-stretched multi-layered film 10m with visually-distinct stretched regions created by MD and TD ring rolling. The incrementally-stretched multi-layered film 10m can have a checker board pattern 36b. The checker board pattern 36b can include alternating series of un-stretched regions 44b and stretched regions 46b, 46c. As shown by FIG. 5, stretched regions 46b, 46c can be visually distinct from the un-stretched regions 44b. In particular, stretched regions 46b, 46c can be white and opaque. The stretched regions 46b, 46c can include stripes 46b that extend along the multi-layered film 10m in the machine direction, and stripes 46c that extend along the film in the transverse direction. As shown by FIG. 5, in one or more implementations, the aspect ratio of the rows and columns of the stretched regions 46b, 46c can be approximately 1 to 1. In alternative implementations, the aspect ratio of the rows and columns of the rows and columns of the stretched regions 46b, 46c can be greater or less than 1 to 1, as explained in greater detail in relation to FIG. 11.

The incrementally-stretched multi-layered film 10m with visually-distinct stretched regions created by MD and TD ring rolling can allow for even greater material savings by further increasing the surface area of a given portion of film. Additionally, MD and TD ring rolling can provide properties or advantages not obtained by MD or TD ring rolling alone. Thus, checker board pattern 36b created by the stretched regions 46b, 46c can signify these transformations to a consumer.

Figure 6:
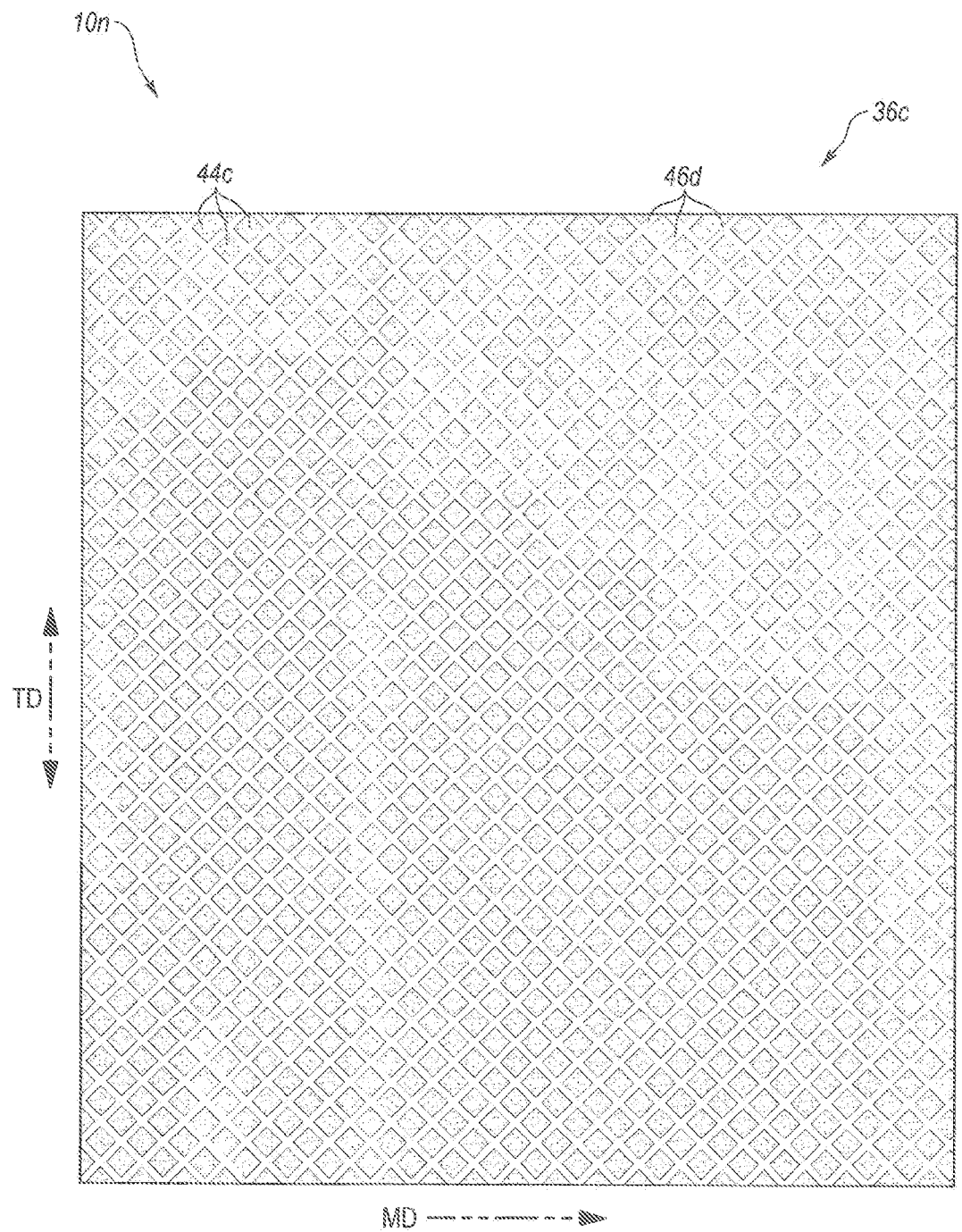
FIG. 6 illustrates a view of multi-layered thermoplastic film including visually-distinct stretched regions created by diagonal direction intermeshing rollers in accordance with one or more implementations of the present invention.

In yet further implementations, a manufacturer can use DD ring rolling to incrementally stretch a thermoplastic film to create visually-distinct stretched regions. A DD ring rolling processes (and associated DD intermeshing rollers) can be similar to the MD ring rolling process (and associated MD intermeshing rollers 12, 14) described herein above, albeit that the ridges and grooves of the DD intermeshing rollers can extend at an angle relative to the axes of rotation. For example, FIG. 6 illustrates a view of an incrementally-stretched multi-layered film 10n with visually-distinct stretched regions created by DD ring rolling. The incrementally-stretched multi-layered film 10n can have a diamond pattern 36c. The diamond pattern 36c can include alternating series of diamond-shaped un-stretched regions 44c and stretched regions 46d. As shown by FIG. 6, stretched regions 46d can be visually distinct. The stretched regions can include stripes 46d oriented at an angle relative to the transverse direction such that the stripes 46d are neither parallel to the transverse or machine direction.

One will appreciate in light of the disclosure herein that one or more implementations can include stretched regions arranged in other patterns/shapes. Such additional patterns include, but are not limited to, intermeshing circles, squares, diamonds, hexagons, or other polygons and shapes. Additionally, one or more implementations can include stretched regions arranged in patterns that are combinations of the illustrated and described patterns/shapes.

In accordance with another implementation, a structural elastic like film (SELF) process may be used to create a thermoplastic film with strainable networks. As explained in greater detail below, the strainable networks can include visually-distinct stretched regions. U.S. Pat. Nos. 5,518,801, 6,139,185; 6,150,647; 6,394,651; 6,394,652; 6,513,975; 6,695,476; U.S. Patent Application Publication No. 2004/0134923; and U.S. Patent Application Publication No. 2006/0093766 each disclose processes to form strainable networks or patterns of strainable networks suitable for use with implementations of the present invention. The contents of each of the aforementioned patents and patent application publications are incorporated in their entirety by reference herein.

Figure 7:
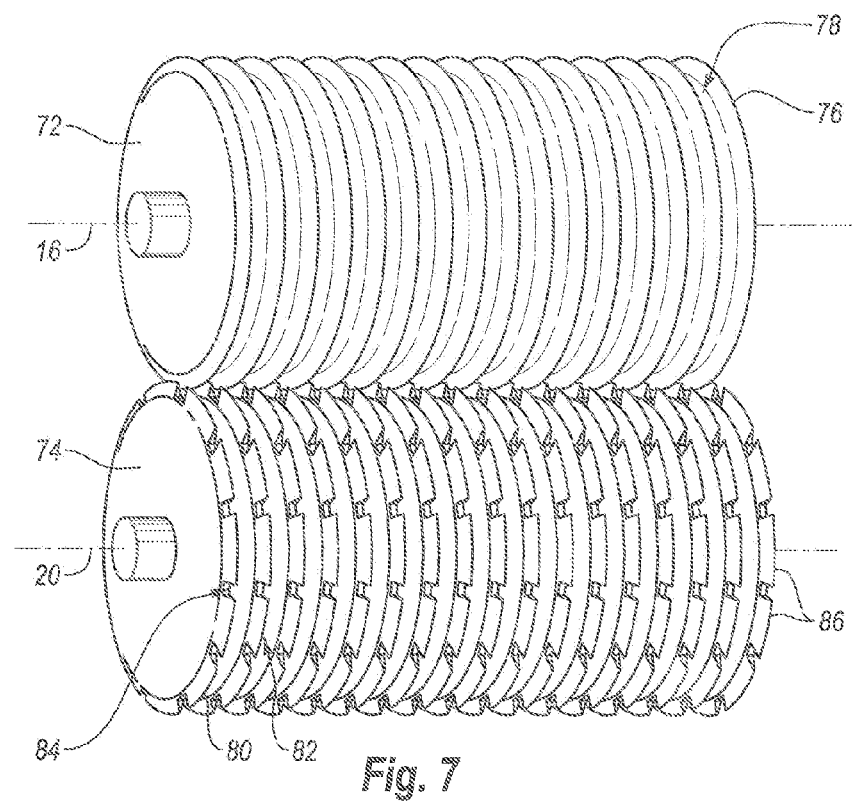
FIG. 7 illustrates a schematic diagram of a set of intermeshing rollers used to impart strainable networks into a film in accordance with one or more implementations of the present invention.

FIG. 7 illustrates a pair of SELF'ing intermeshing rollers 72, 74 for creating strainable networks with visually-distinct stretched regions in a film. The first SELF'ing intermeshing roller 72 can include a plurality of ridges 76 and grooves 78 extending generally radially outward in a direction orthogonal to an axis of rotation 16. Thus, the first SELF'ing intermeshing roller 72 can be similar to a TD intermeshing roller 52, 54. The second SELF'ing intermeshing roller 74 can include also include a plurality of ridges 80 and grooves 82 extending generally radially outward in a direction orthogonal to an axis of rotation 20. As shown by FIG. 7; however, the ridges 80 of the second SELF'ing intermeshing roller 74 can include a plurality of notches 84 that define a plurality of spaced teeth 86.

Figure 8:
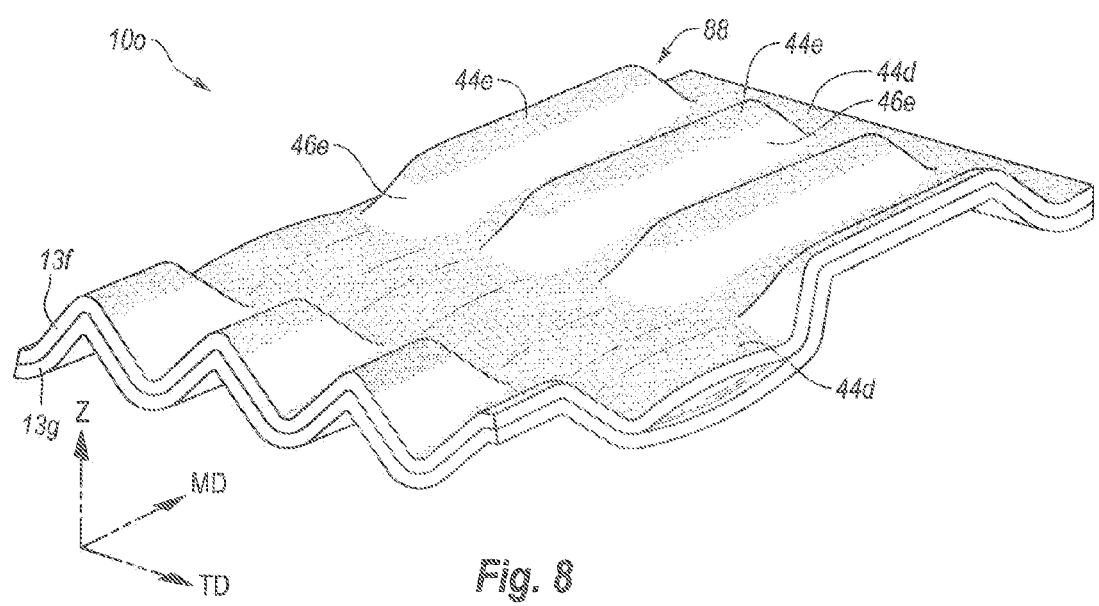
FIG. 8 illustrates a view of a multi-layered thermoplastic film including visually-distinct stretched regions created by the intermeshing rollers of FIG. 7.

Referring now to FIG. 8, an incrementally-stretched film 10f with visually-distinct stretched regions created using the SELF'ing intermeshing rollers 72, 74 is shown. In particular, as the film passes through the SELF'ing intermeshing rollers 72, 74, the teeth 86 can press a portion of the web out of plane to cause permanent, deformation of a portion of the film in the Z-direction. On the other hand the portions of the film that pass between the notched regions 84 and the teeth 86 will be substantially unformed in the Z-direction, resulting in a plurality of deformed, raised, rib-like elements 88.

As shown by FIG. 8, the strainable network of the incrementally-stretched multi-layered film 10o with visually-distinct stretched regions can include first un-stretched regions 44d, second un-stretched regions 44e, and stretched transitional regions 46e connecting the first and second un-stretched regions 44d, 44e. The second un-stretched regions 44e and the stretched regions 46e can form the raised rib-like elements 88 of the strainable network.

FIG. 8 illustrates that the stretched regions 46e can be visually distinct from the un-stretched regions 44d, 44e. In particular, stretched regions 46e can be white and opaque. The stretched regions 46e can be discontinuous or be separated as they extend across the multi-layered film 10o in both transverse and machine directions. This is in contrast to stripes that extend continuously across a film in one of the machine and transverse directions.

The rib-like elements 88 can allow the multi-layered film 10o to undergo a substantially "geometric deformation" prior to a "molecular-level deformation." As used herein, the term "molecular-level deformation" refers to deformation which occurs on a molecular level and is not discernible to the normal naked eye. That is, even though one may be able to discern the effect of molecular-level deformation, e.g., elongation of the film, one is not able to discern the deformation which allows or causes it to happen. This is in contrast to the term "geometric deformation." As used herein, the term "geometric deformation" refers to deformations of the multi-layered film 10o which are generally discernible to the normal naked eye when the multi-layered film 10o or articles embodying the multi-layered film 10o are subjected to an applied strain. Types of geometric deformation include, but are not limited to bending, unfolding, and rotating.

Thus, upon an applied strain, the rib-like elements 88 can undergo geometric deformation before either the rib-like elements 88 or the flat regions undergo molecular-level deformation. For example, an applied strain can pull the rib-like elements 88 back into plane with the flat regions prior to any molecular-level deformation of the multi-layered film 10o. Geometric deformation can result in significantly less resistive forces to an applied strain than that exhibited by molecular-level deformation.

Thus, the strainable network of the multi-layered film 10o may provide improved properties to the multi-layered film 10o, such as elasticity, improved tear, and improved impact properties. The visually-distinct stretched regions 46e can provide notice to a consumer that the multi-layered film 10o includes the improved properties provided by the strainable network. Additionally, the opacity of the visually-distinct stretched regions 46e can provide a look or feel of increased thickness and strength.

Similar to multi-layered films 10g, 10k shown and described in relation to FIGS. 1D-1E, the film layers 13f, 13g of the multi-layered film 10o can be discontinuously laminated. In particularly, the film layers 13f, 13g can be laminated at the visually-distinct regions 46e, but un-laminated or un-bonded at the un-stretched regions 44.

Figure 9:
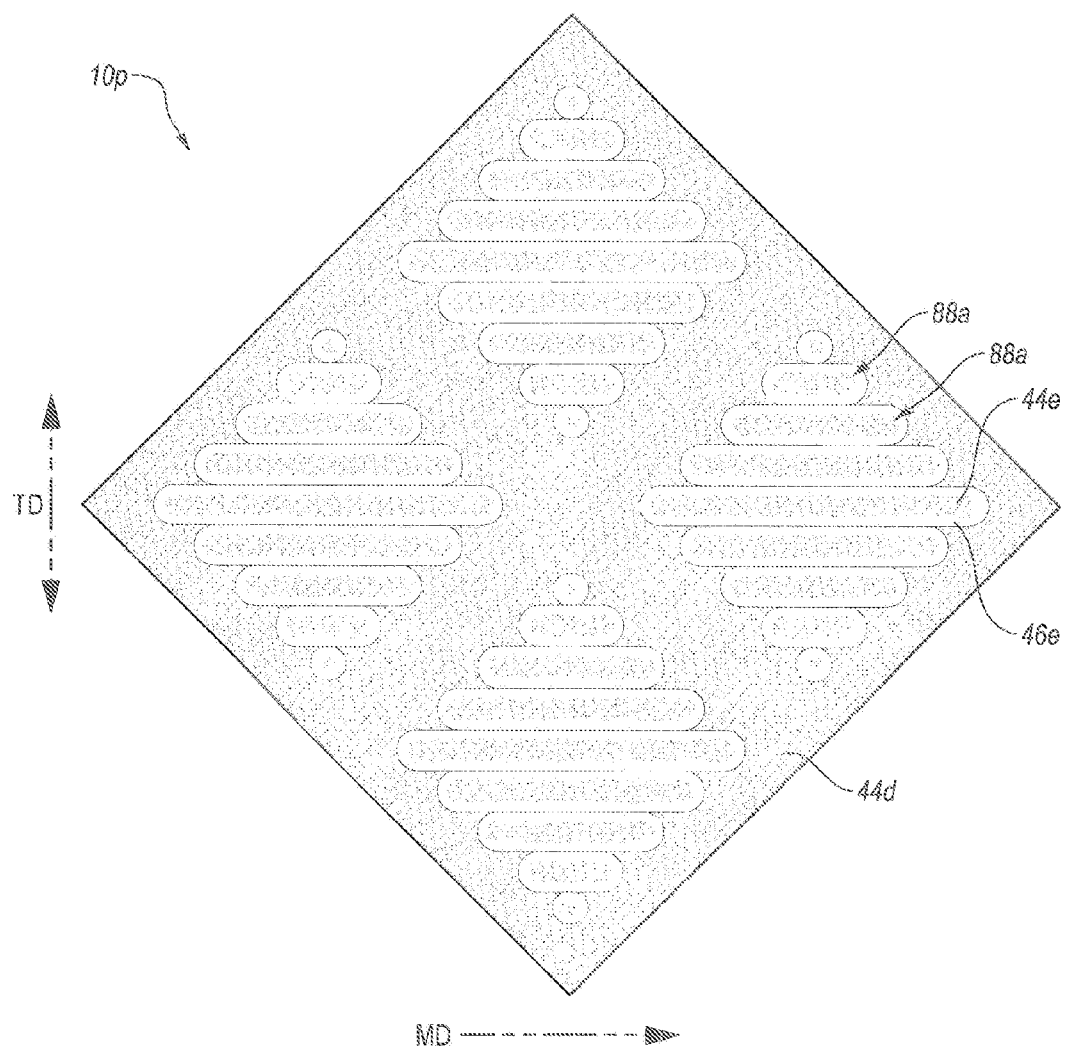
FIG. 9 illustrates a view of a multi-layered thermoplastic film including strainable networks having visually-distinct stretched regions in accordance with one or more implementations of the present invention.

One will appreciate in light of the disclosure herein that the pattern of the strainable network of FIG. 8 is only one pattern suitable for use with the present invention. For example, FIG. 9 illustrates another strainable network pattern that can include visually-distinct stretched regions. In particular, FIG. 9 illustrates an incrementally-stretched multi-layered film 10p with a strainable network of rib-like elements 88a arranged in diamond patterns. The strainable network of the incrementally-stretched multi-layered film 10p with visually-distinct stretched regions can include first un-stretched regions 44d, second un-stretched regions 44e, and stretched transitional regions 46e connecting the first and second un-stretched regions 44d, 44e. The stretched regions 46e can be visually distinct from the un-stretched regions 44d, 44e. In particular, stretched regions 46e can be white and opaque.

One or more implementations of the present invention can include strainable network patterns other than those shown by FIGS. 8 and 9, or combinations of various patterns. It should be understood that the term "pattern" is intended to include continuous or discontinuous sections of patterns, such as may result, for example, from the intersection of first and second patterns with each other. Furthermore, the patterns can be aligned in columns and rows aligned in the machine direction, the transverse direction, or neither the machine or transverse directions.

One will appreciate in light of the disclosure herein that the incrementally-stretched multi-layered films with visually-distinct stretched regions can form part of any type of product made from, or incorporating, thermoplastic films. For instance, grocery bags, trash bags, sacks, packaging materials, feminine hygiene products, baby diapers, adult incontinence products, sanitary napkins, bandages, food storage bags, food storage containers, thermal heat wraps, facial masks, wipes, hard surface cleaners, and many other products can include incrementally-stretched with visually-distinct stretched regions to one extent or another. Trash bags and food storage bags may be particularly benefited by the films of the present invention.

Figure 10:
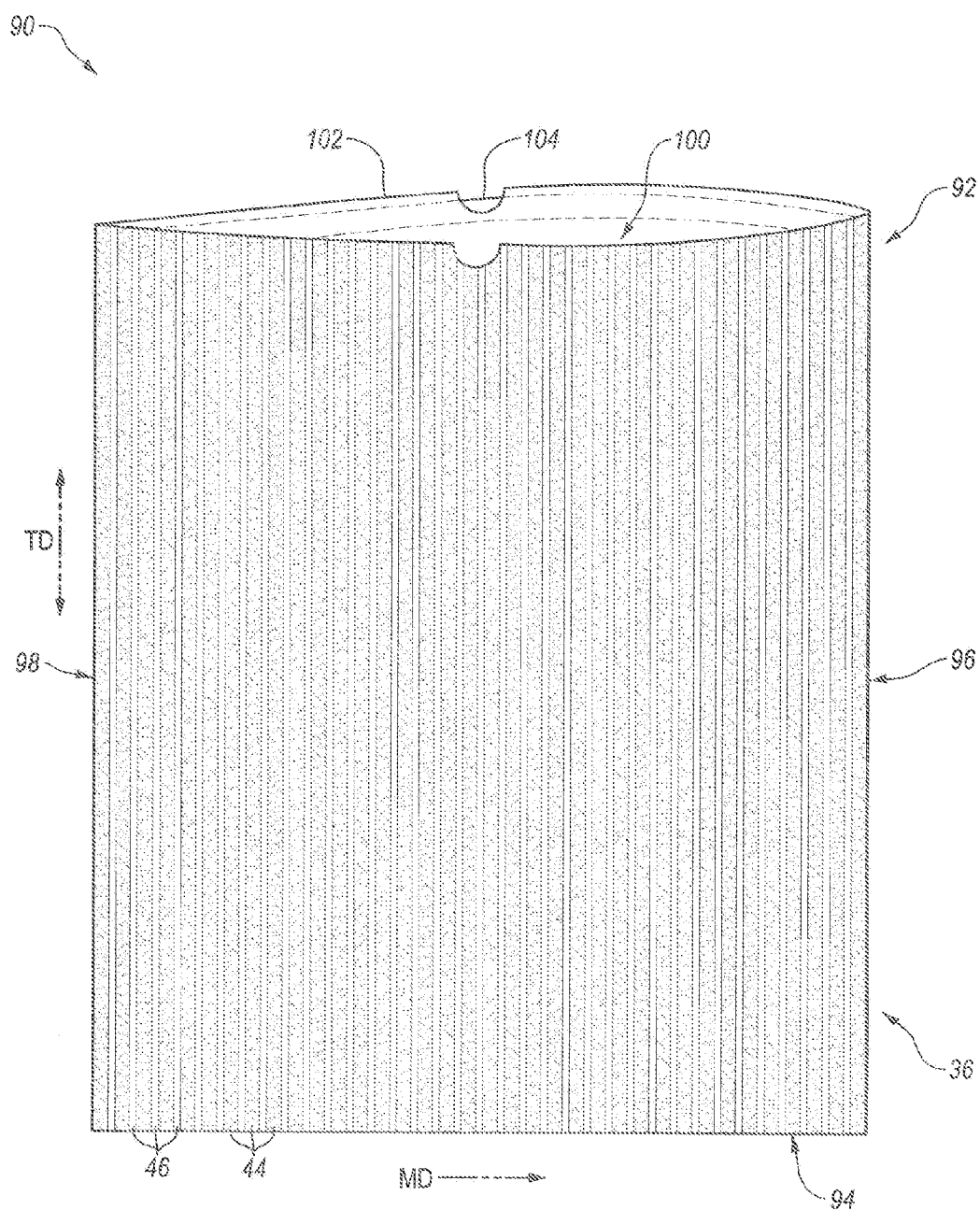
FIG. 10 illustrates a bag incorporating the multi-layered film of FIG. 2.

Referring to FIG. 10, in a particular implementation of the present invention, the incrementally-stretched film 10b illustrated in FIG. 2 may be incorporated in a bag construction, such as a flexible draw tape bag. The multi-layered bag 90 can include a bag body 92 formed from a piece of incrementally-stretched multi-layered film 10b folded upon itself along a bag bottom 94. Side seams 96 and 98 can bond the sides of the bag body 92 together to form a semi-enclosed container having an opening 100 along an upper edge 102. The multi-layered bag 90 also optionally includes closure means 104 located adjacent to the upper edge 102 for sealing the top of the multi-layered bag 90 to form a fully-enclosed container or vessel. The multi-layered bag 90 is suitable for containing and protecting a wide variety of materials and/or objects. The closure means 104 can comprise flaps, adhesive tapes, a tuck and fold closure, an interlocking closure, a slider closure, a zipper closure or other closure structures known to those skilled in the art for closing a bag.

As shown, the sides of the bag body 92 can include un-stretched regions 44 and stretched regions 46 in the form of stripes. The stretched regions 46 can be visually distinct from the un-stretched regions 44. In particular, the stretched regions 46 can be white and opaque. The stripes can extend across the multi-layered bag 90 in the TD direction, or in other words, from the bag bottom 94 to the upper edge 102. The multi-layered bag 90 can require less material to form than an identical bag formed with an un-stretched film 10a of the same thermoplastic material. Additionally, despite requiring less material, the multi-layered bag 90 can include improved properties imparted by MD ring rolling. The visually-distinct stretched regions 46 can serve to notify a consumer of the improved properties. Furthermore, while the bag body 92 can include opaque regions created by voiding agents, the bag body 92 can be non porous. Thus, the bag body 92 can prevent liquids, and at least substantially prevent gases, from passing there through.

Figure 11:
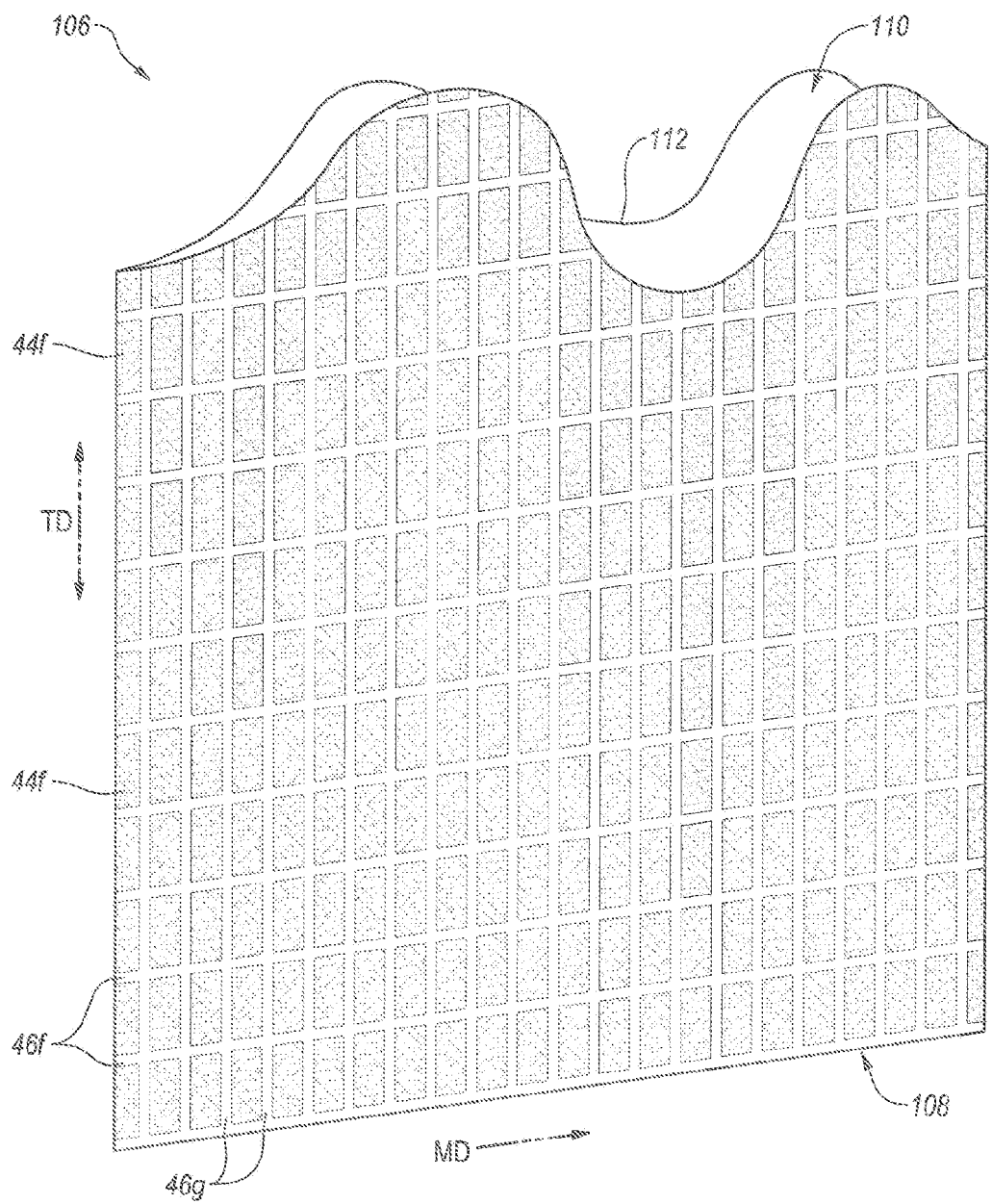
FIG. 11 illustrates a bag incorporating a multi-layered film having visually-distinct stretched regions in accordance with one or more implementations of the present invention.

FIG. 11 illustrates a multi-layered tie bag 106 incorporating an incrementally-stretched multi-layered film with visually-distinct stretched regions in accordance with an implementation of the present invention. As shown the sides of the tie bag 106 can include a pattern of un-stretched regions 44f and stretched regions 46f, 46g created by MD and TD ring rolling. The stretched regions 46f, 46g can be visually distinct from the un-stretched regions 44f. In particular, stretched regions 46f, 46g can be white and opaque.

The visually-distinct stretched regions can include stripes 46f that extend across the bag 106 in the machine direction. Additionally, visually-distinct stretched regions can include stripes 46g that extend across the bag 106 in the transverse direction, or in other words from the bag bottom 108 to flaps 110 of an upper edge 112 of the multi-layered bag 106.

In comparison with the film 10d of FIG. 5, the spacing between the MD extending stripes 46f is greater in the multi-layered bag 106. This effect is created by using MD ring rolls having a greater pitch between ridges. Similarly, the spacing of the TD extending stripes 46g is greater in the multi-layered bag 106 than the multi-layered film 10m. This effect is created by using TD ring rolls having a greater pitch between ridges. Furthermore, the relative spacing between the MD extending stripes and the TD extending stripes differs in the multi-layered bag 106, while relative spacing is the same in the multi-layered film 10m. This effect is created by using TD ring rolls having a greater pitch between ridges compared to the pitch between ridges of the MD ring rolls. One will appreciate in light of the disclosure herein that the use of intermeshing rollers with greater or varied ridge pitch can provide the different spacing and thicknesses of the stripes. Thus, a manufacturer can vary the ridge pitch of the intermeshing rollers to vary the pattern of the visually-distinct stretched regions, and thus, the aesthetic and/or properties of the bag or film.

Figure 12:
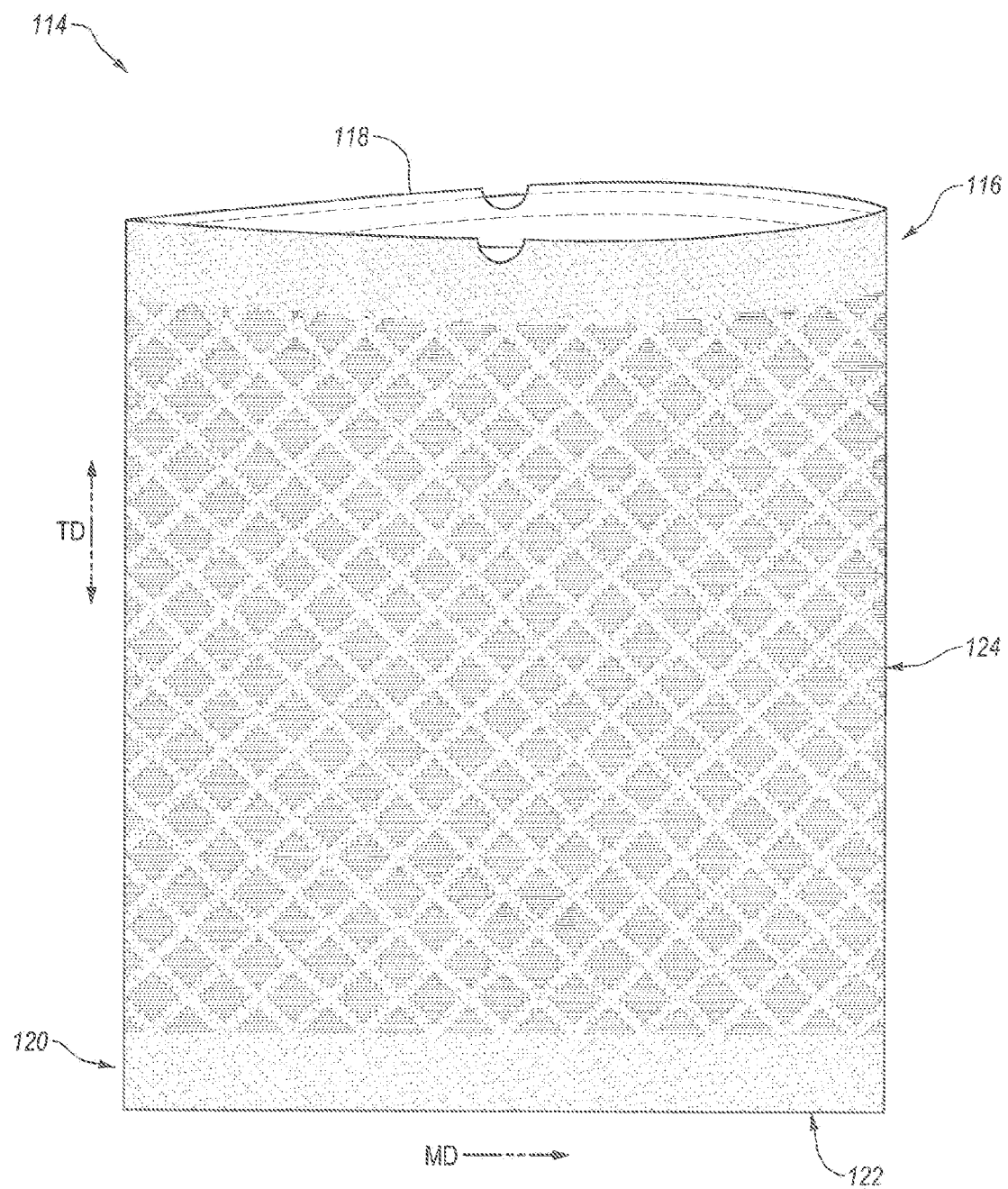
FIG. 12 illustrates a bag incorporating a middle section having visually-distinct stretched regions in accordance with one or more implementations of the present invention.

In addition to the varying the pattern of visually-distinct stretched regions in a bag or film, one or more implementations also include providing visually-distinct stretched regions in certain sections of a bag or film, and only un-stretched regions in other sections of the bag or film. For example, FIG. 12 illustrates a multi-layered bag 114 having an upper section 116 adjacent a top edge 118 that is devoid of visually-distinct stretched regions. Similarly, the multi-layered bag 114 includes a bottom section 120 adjacent a bottom fold or edge 122 devoid of visually-distinct stretched regions. In other words, both the top section 116 and bottom section 120 of the multi-layered bag 114 can each comprise un-stretched regions.

A middle section 124 of the multi-layered bag 114 between the upper and lower sections 116, 120 on the other hand can include visually-distinct stretched regions. In particular, FIG. 12 illustrates that the middle section can include a strainable network of rib-like elements arranged in diamond patterns similar to the multi-layered film 10p of FIG. 9. Thus, the middle section 124 of the multi-layered bag 114 can include improved properties, such as elasticity and impact resistance, created by the strainable network. Furthermore, the white and opaque stretched regions (i.e., the stretched transitional regions of the rib-like elements) can serve to notify a consumer of that the middle section 124 includes improved properties.

Figure 13:
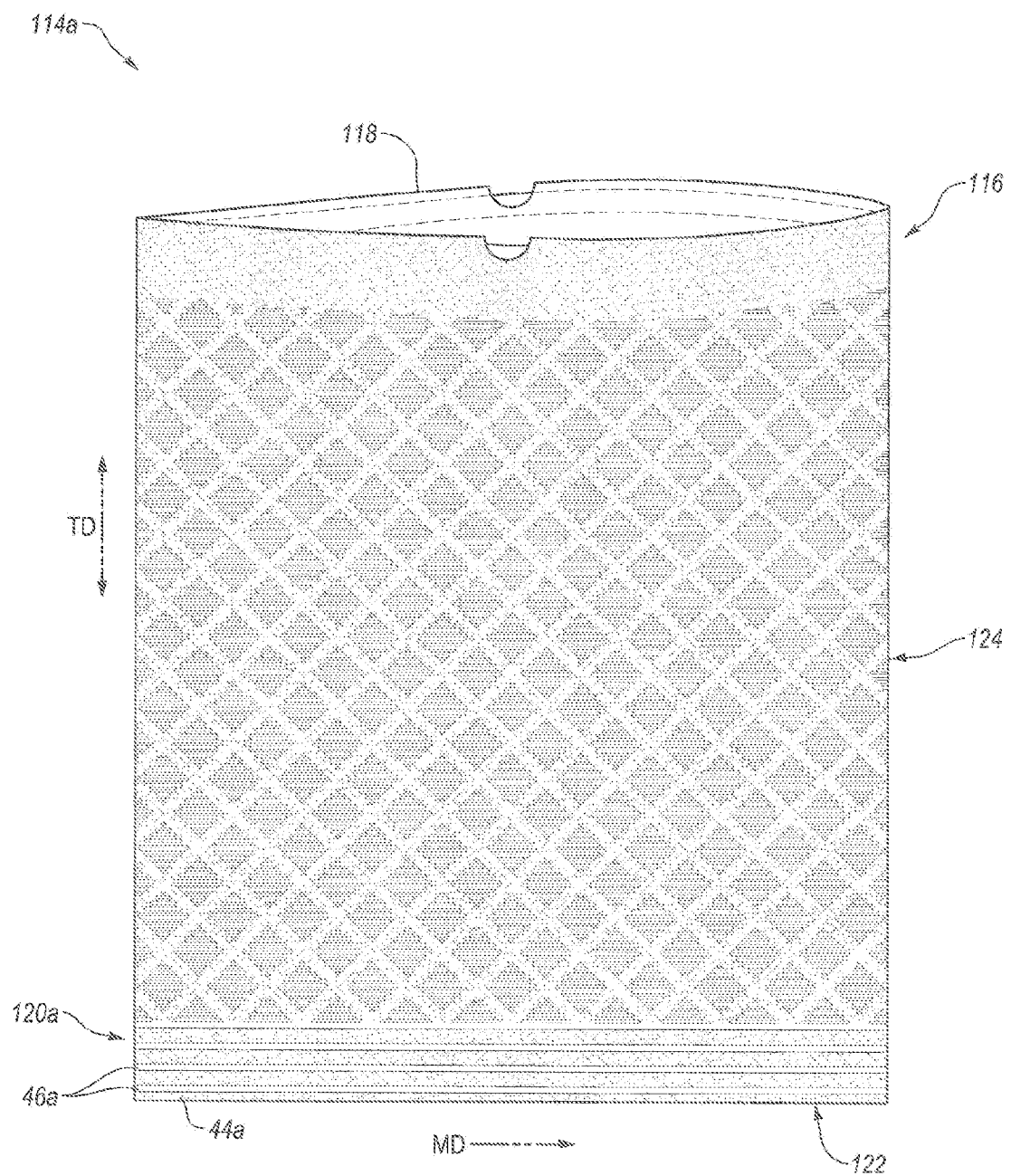
FIG. 13 illustrates a bag incorporating sections of different patterns of visually-distinct stretched regions in accordance with one or more implementations of the present invention.

In one or more additional implementations, the present invention includes providing different visually-distinct stretched regions in different sections of a bag or film. For example, FIG. 13 illustrates a multi-layered bag 114a similar to the multi-layered bag 114 of FIG. 12, albeit that the bottom section 120a includes alternating series of un-stretched regions 44a and stretched regions 46a created by TD ring rolling. Thus, the middle section 124 of the bag 114 can include one set of improved properties created by the strainable network, and the bottom section 120a can include another set of improved properties created by TD ring rolling. Furthermore, the white and opaque stretched regions can serve to notify a consumer of the different properties of the middle section 124 and the bottom section 120a.

Figure 14:
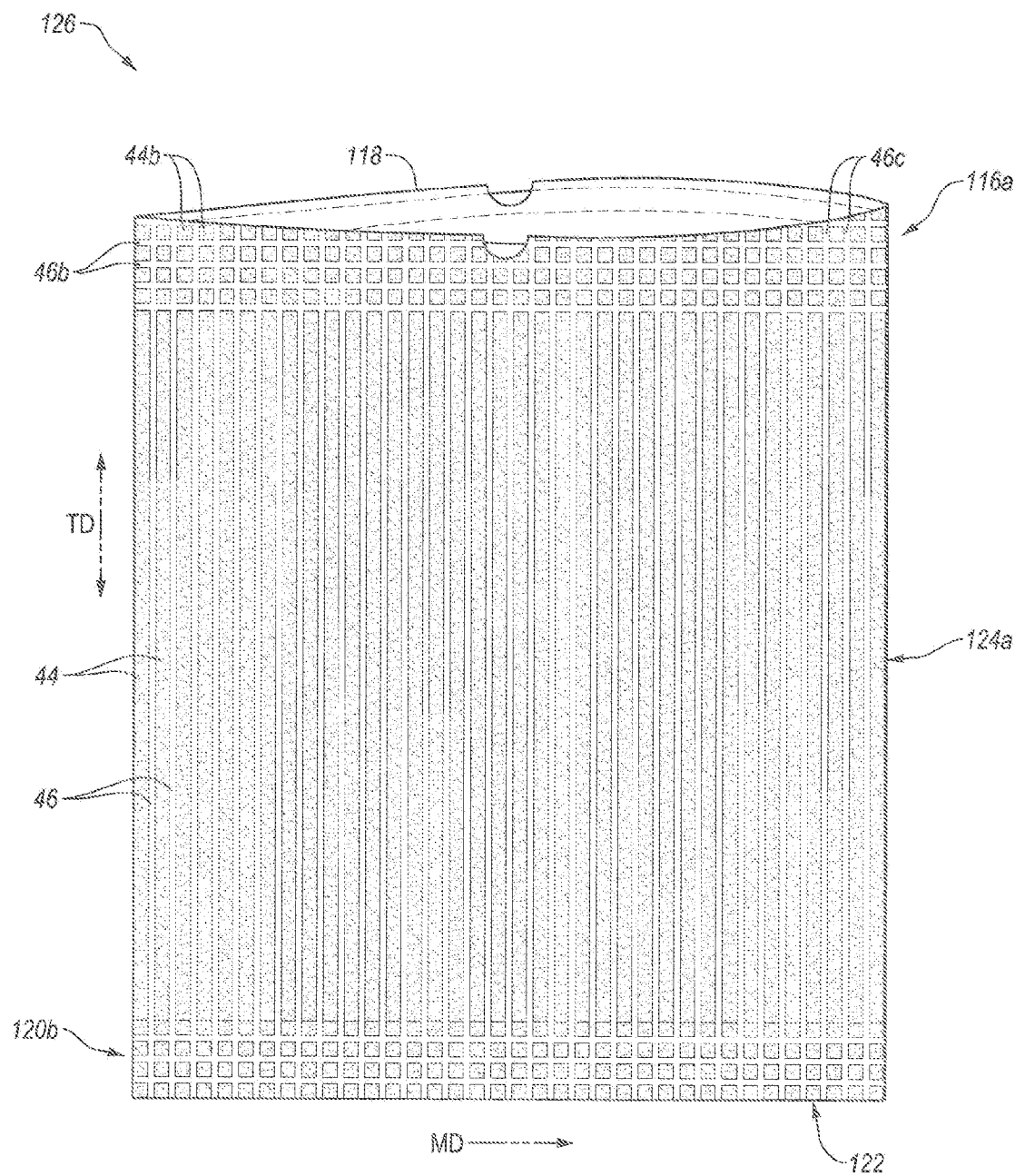
FIG. 14 illustrates another bag incorporating sections of different patterns of visually-distinct stretched regions in accordance with one or more implementations of the present invention.

FIG. 14 illustrates yet another multi-layered bag 126 including having an upper section 116a adjacent a top edge 118 that includes alternating series of un-stretched regions 44b and visually-distinct stretched regions 46b, 46c created by MD and TD ring rolling similar to the film 10m of FIG. 5. Furthermore, the middle section 124a of the multi-layered bag 126 can include un-stretched regions 44 and stretched regions 46 in the form of stripes created by MD ring rolling. The stretched regions 46 can be visually distinct from the un-stretched regions 44. In particular, stretched regions 46 can be white and opaque.

Thus, one will appreciate in light of the disclosure herein that a manufacturer can tailor specific sections or zones of a bag or film with desirable properties by MD, TD, or DD ring rolling, SELF'ing, or a combination thereof. Furthermore, the different visually-distinct stretched regions can serve to notify a consumer of the properties of the different sections. One will appreciate in light of the disclosure herein that the visually-distinct stretched regions can be more visually discernable than any geometric deformation alone.

Figure 15:
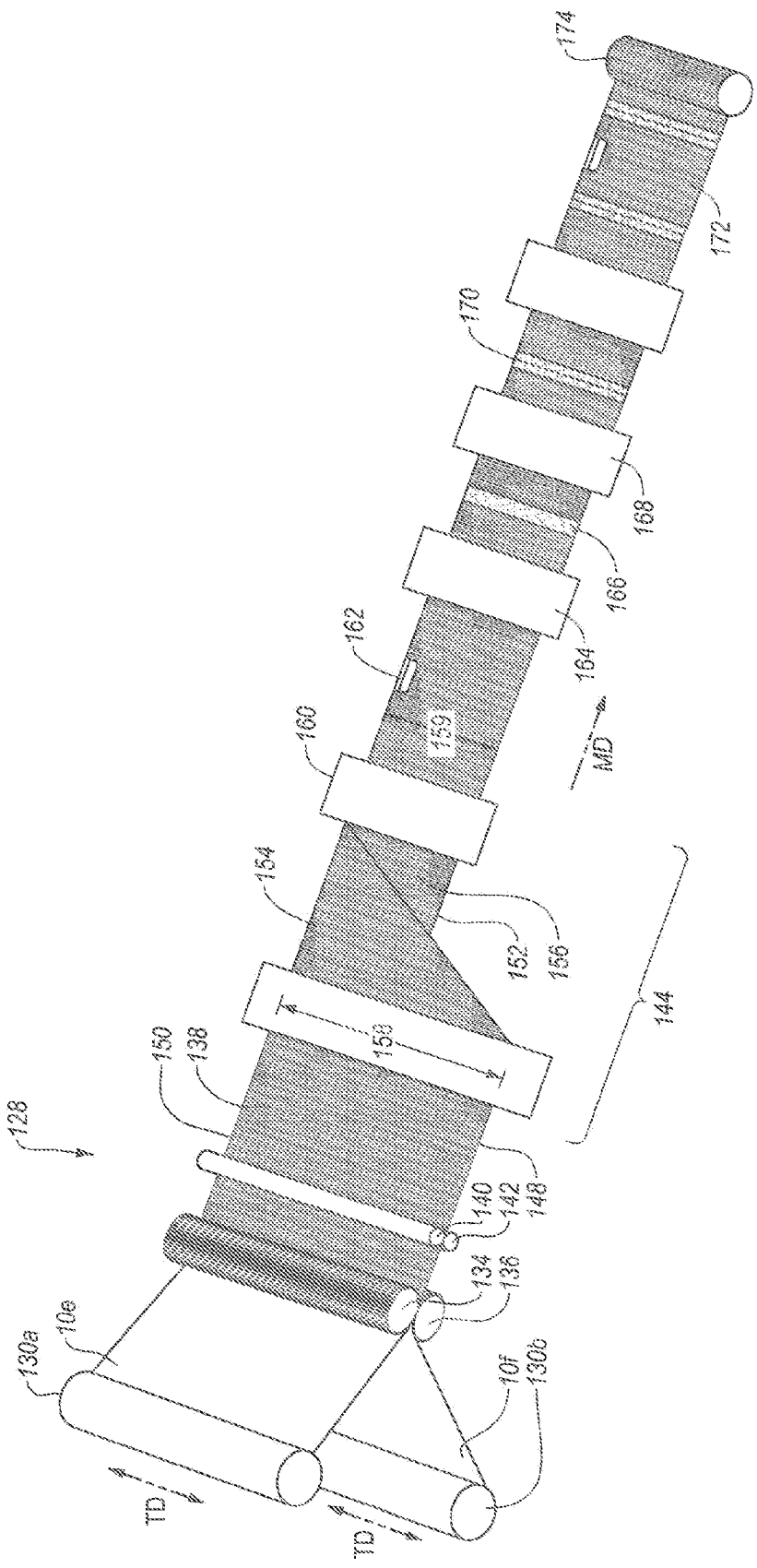
FIG. 15 illustrates a schematic diagram of a bag manufacturing process in accordance with one or more implementations of the present invention.

FIG. 15 illustrates an exemplary embodiment of a high-speed manufacturing process 128 for incrementally stretching thermoplastic film(s) to produce visually-distinct stretched regions and produce a multi-layered plastic bag there from. According to the process 128, a first thermoplastic film layer 10e and a second thermoplastic film layer 10f are unwound from roll 130a, 130b and directed along a machine direction.

The film layers 10e, 10f can pass between first and second cylindrical intermeshing rollers 134, 136 to incrementally stretch and discontinuously laminate the un-stretched film layers 10e, 10f to create un-stretched regions and visually-distinct stretched regions in at least one section of a multi-layered film 138. The intermeshing rollers 134, 136 can have a construction similar to that of intermeshing rollers 12, 14 of FIGS. 1A-1B, or any of the other intermeshing rollers shown or described herein. The rollers 134, 136 may be arranged so that their longitudinal axes are perpendicular to the machine direction. Additionally, the rollers 134, 136 may rotate about their longitudinal axes in opposite rotational directions. In various embodiments, motors may be provided that power rotation of the rollers 134, 136 in a controlled manner. As the film layers 10e, 10f pass between the first and second rollers 134, 136, the ridges and/or teeth of the intermeshing rollers 134, 136 can form an incrementally-stretched multi-layered film 138 with visually-distinct stretched regions.

During the manufacturing process 128, the incrementally-stretched multi-layered film 138 can also pass through a pair of pinch rollers 140, 142. The pinch rollers 140, 142 can be appropriately arranged to grasp the incrementally-stretched multi-layered film 138 with visually-distinct stretched regions. The pinch rollers 140, 142 may facilitate and accommodate the incrementally-stretched multi-layered film 138 with visually-distinct stretched regions.

A folding operation 144 can fold the incrementally-stretched multi-layered film 138 with visually-distinct stretched regions to produce the sidewalls of the finished bag. The folding operation 144 can fold the incrementally-stretched multi-layered film 138 with visually-distinct stretched regions in half along the transverse direction. In particular, the folding operation 144 can move a first edge 148 adjacent to the second edge 150, thereby creating a folded edge 152. The folding operation 144 thereby provides a first film half 154 and an adjacent second web half 156. The overall width 158 of the second film half 156 can be half the width 158 of the pre-folded incrementally-stretched multi-layered film 138 with visually-distinct stretched regions.

To produce the finished bag, the processing equipment may further process the folded incrementally-stretched multi-layered film 138 with visually-distinct stretched regions. In particular, a draw tape operation 160 can insert a draw tape 162 into the incrementally-stretched multi-layered film 138 with visually-distinct stretched regions. Furthermore, a sealing operation 164 can form the parallel side edges of the finished bag by forming heat seals 166 between adjacent portions of the folded incrementally-stretched multi-layered film 138 with visually-distinct stretched regions. The heat seals 166 may be spaced apart along the folded incrementally-stretched multi-layered film 138 with visually-distinct stretched regions. The sealing operation 164 can form the heat seals 166 using a heating device, such as, a heated knife.

A perforating operation 168 may form a perforation 170 in the heat seals 166 using a perforating device, such as, a perforating knife. The perforations 170 in conjunction with the folded outer edge 152 can define individual bags 172 that may be separated from the incrementally-stretched multi-layered film 138. A roll 174 can wind the incrementally-stretched multi-layered film 138 with visually-distinct stretched regions embodying the finished bags 172 for packaging and distribution. For example, the roll 174 may be placed into a box or bag for sale to a customer.

In still further implementations, the folded incrementally-stretched multi-layered film 138 may be cut into individual bags along the heat seals 166 by a cutting operation. In another implementation, the folded incrementally-stretched multi-layered film 138 with visually-distinct stretched regions may be folded one or more times prior to the cutting operation. In yet another implementation, the side sealing operation 164 may be combined with the cutting and/or perforation operations 168.

One will appreciate in light of the disclosure herein that the process 128 described in relation to FIG. 15 can be modified to omit or expanded acts, or vary the order of the various acts as desired. For example, three or more separate film layers can be incrementally stretched and discontinuously laminated together to form an incrementally-stretched multi-layered film 138. Alternatively, process 128 can use a single multi-layered film with two or more film layers that are co-extruded or continuously laminated to form multi-layered bags with visually distinct regions.

Figure 16:
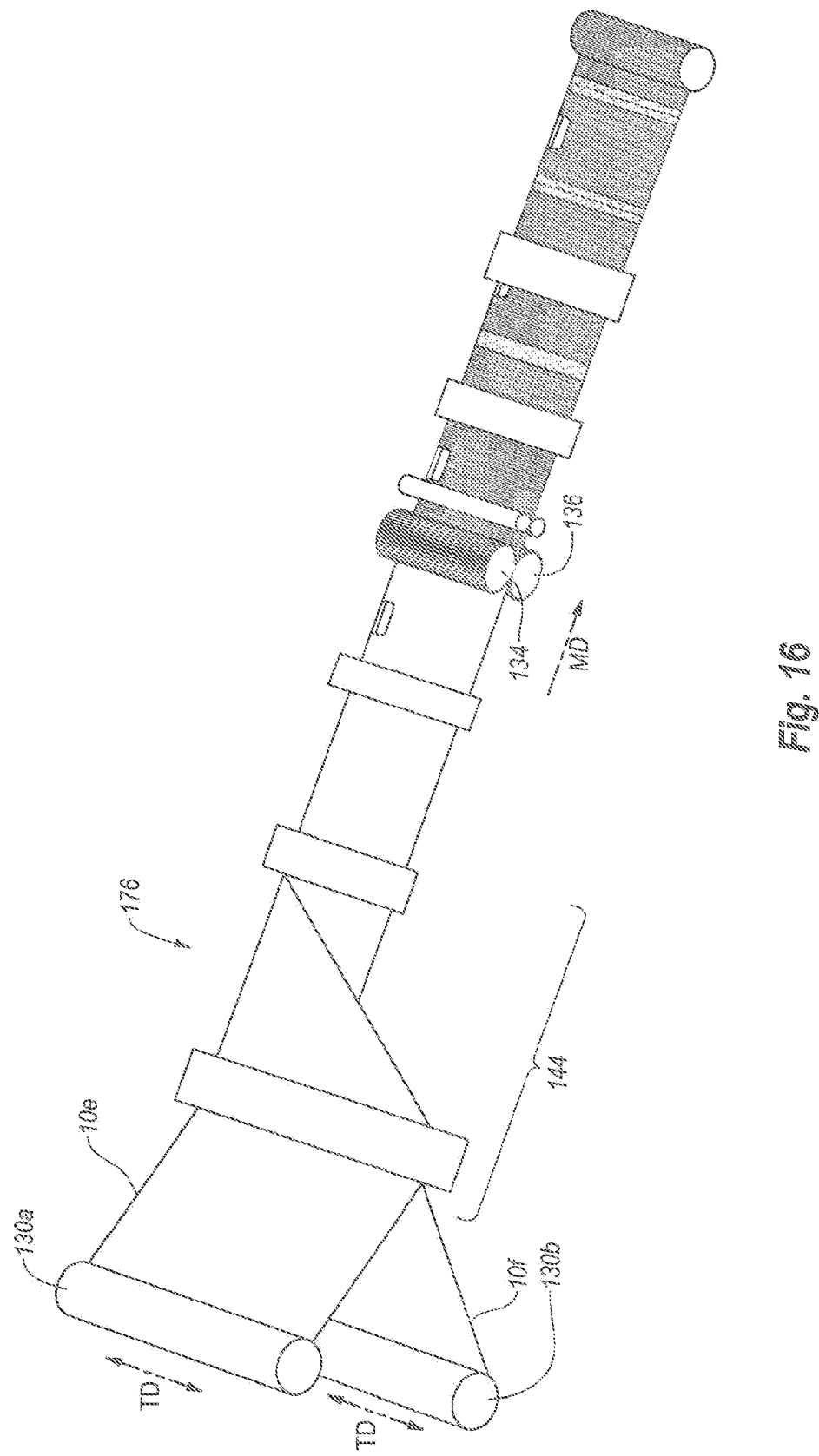
FIG. 16 illustrates a schematic diagram of another bag manufacturing process in accordance with one or more implementations of the present invention.

FIG. 16 illustrates another manufacturing process 176 for producing a plastic bag having visually-distinct stretched regions imparted therein. The process 176 can be similar to process 128 of FIG. 15, except that the film layers 10e, 10f are stretched by intermeshing rollers 134, 136 after the folding operation 144 has folded the film layers 10e, 10f in half.

Figure 17:
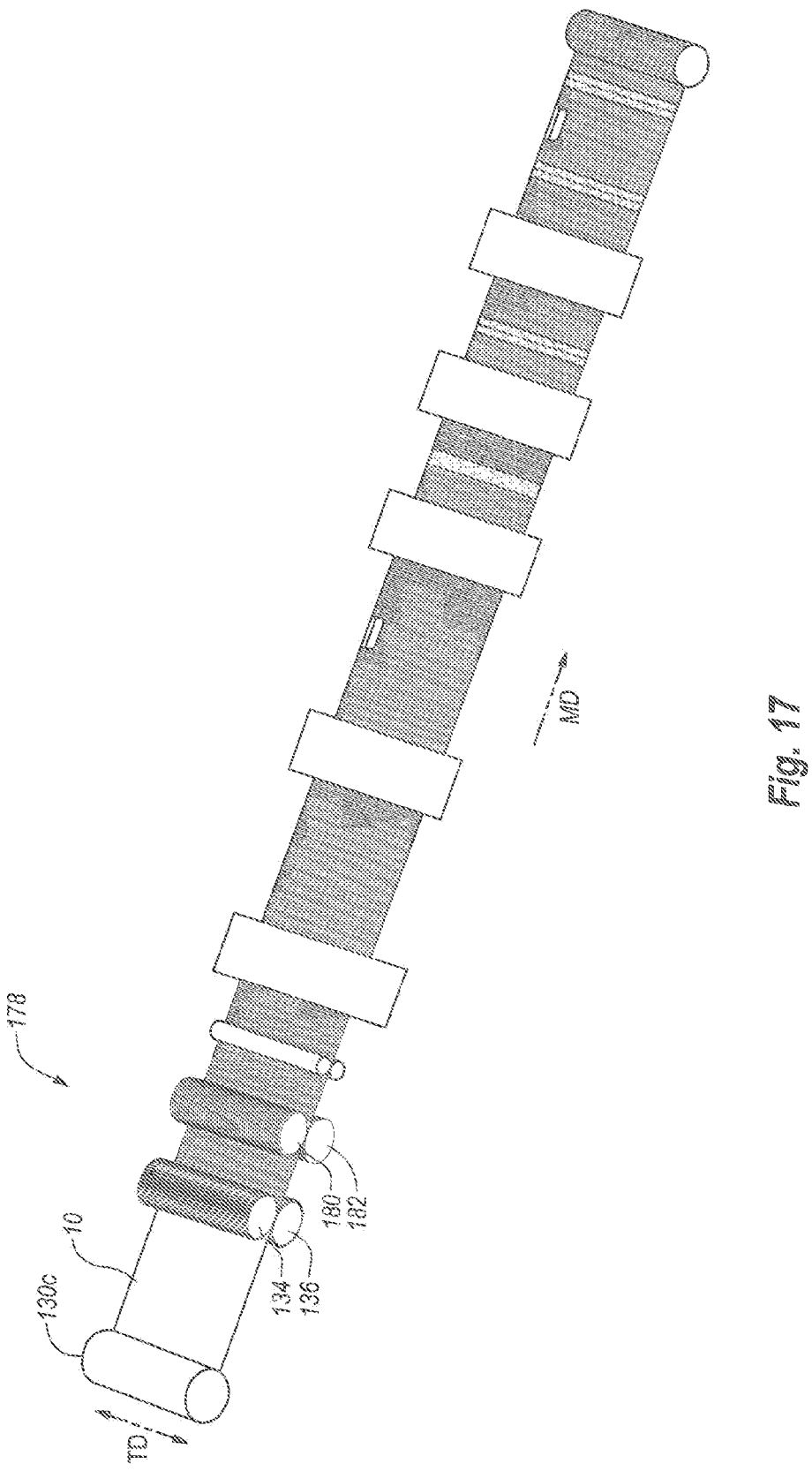
FIG. 17 illustrates a schematic diagram of yet another bag manufacturing process in accordance with one or more implementations of the present invention.

FIG. 17 illustrates yet another manufacturing process 178 for producing a multi-layered plastic bag having visually-distinct stretched regions imparted therein. The process 178 can be similar to process 128 of FIG. 15, except that the multi-layered film 10 includes two or more joined film layers and is folded prior to winding it on the roll 130c. Thus, in such implementations, the multi-layered film 10 unwound from the roll 130 is already folded. Additionally, the manufacturing process 178 illustrates that after passing through intermeshing rollers 134, 136, the film can pass through another set of intermeshing rollers 180, 182 to impart a second pattern of visually-distinct stretched regions to one or more sections of the multi-layered film 10. The intermeshing rollers 180, 182 can have a construction similar to that of intermeshing rollers 52, 54 of FIG. 3, or any of the other intermeshing rollers shown or described herein.

Implementations of the present invention can also include methods of incrementally stretching a film of thermoplastic material to produce visually-distinct stretched regions. The following describes at least one implementation of a method with reference to the components and diagrams of FIGS. 1A through 17. Of course, as a preliminary matter, one of ordinary skill in the art will recognize that the methods explained in detail herein can be modified to install a wide variety of configurations using one or more components of the present invention. For example, various acts of the method described can be omitted or expanded, and the order of the various acts of the method described can be altered as desired.

For example, one method in accordance with one or more implementations of the present invention can include providing a providing a first film layer comprising a thermoplastic material and a voiding agent. For example, the method can involve providing a film layer 11a, 10e comprising between about 65 and about 99 percent by weight of a thermoplastic material, and between about 1 and about 35 percent by weight of a voiding agent. The method can also involve providing at least a second film layer 11b, 10f. The first film layer 11a, 10e and the at least a second film layer 11b, 10f can be co-extruded layers, continuously laminated layers, or separate film layers. Additionally, the at least a second film layer can comprise a second film layer 10i, 11d and a third film layer 10h, 11e.

The method can also include incrementally cold stretching the first film layer and at least a second film layer to create stretched regions intermittingly dispersed among un-stretched regions. In one or more implementations this can involve imparting a pattern 36 of un-stretched regions 44 and stretched regions 46 that are visually distinct from un-stretched regions 44. For example, the method can involve MD ring rolling the film, TD ring rolling the film, DD ring rolling the film, SELF'ing the film, or a combination thereof. More specifically, the method can involve passing the first film layer and at least a second film layer through intermeshing rollers. As the film 10 passes through the intermeshing rollers, ridges can impart the pattern 36 into the film and incrementally stretch the film 10. Furthermore, when the first film layer and the second film layer are separate film layers, intermeshing rollers can discontinuously laminate the first film layer and the second film layer together. In any event, the stretched regions of at least the first film layer are more opaque than the un-stretched regions of the first film layer.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

We claim:

1. A multi-layered incrementally-stretched film with visually-distinct stretched regions, comprising:
a first film layer of linear low-density polyethylene and a voiding agent;
a second film layer of linear low-density polyethylene intermittently bonded to the first layer;
a plurality of un-stretched regions formed in the first and second film layers, the un-stretched regions having a first average thickness;
a plurality of stretched regions intermittently dispersed about the plurality of un-stretched regions, the stretched regions having a second average thickness that is smaller than the first average thickness;
wherein:
the stretched regions are more opaque than the un-stretched regions, and
the multi-layered incrementally-stretched film is non-porous.

2. The multi-layered film as recited in claim 1, wherein:
the first film layer comprises between about 65 and about 99 percent by weight of linear low-density polyethylene, and between about 1 and about 35 percent by weight of the voiding agent; and
the second film layer is devoid of voiding agents.

3. The multi-layered film as recited in claim 2, further comprising:
a third film layer;
wherein:
the first film layer is positioned between the second film layer and the third film layer, and
the third film layer is devoid of voiding agents.

4. The multi-layered film as recited in claim 2, wherein the voiding agent comprises calcium carbonate.

5. The multi-layered film as recited in claim 2, wherein:
the stretched regions of the first film layer are more opaque than the un-stretched regions of the first film layer; and
the stretched regions of the second film layer are less opaque than the un-stretched regions of the second film layer.

6. The multi-layered thermoplastic film as recited in claim 1, wherein the first and second film layers are co-extruded.

7. The multi-layered thermoplastic film as recited in claim 1, wherein the first and second film layers are discontinuously laminated.

8. The multi-layered thermoplastic film as recited in claim 1, wherein one or more of the stretched regions in the first or second film layers are non-porous.

9. The multi-layered thermoplastic film as recited in claim 1, wherein the stretched regions comprise one or more of:
- stripes extending along the multi-layered thermoplastic film in a direction transverse to a direction in which the multi-layered thermoplastic film was extruded;
- stripes extending along the multi-layered thermoplastic film in a direction in which the multi-layered thermoplastic film was extruded; or
- discontinuous strainable networks extending in a direction transverse to direction in which the multi-layered thermoplastic film was extruded.

10. A multi-layered thermoplastic film, comprising:
- a plurality of film layers intermittently bonded to each other, wherein at least one film layer of the plurality of film layers is formed from linear low-density polyethylene and a voiding agent;
- a plurality of un-stretched regions formed in the plurality of film layers; and
- a plurality of stretched regions intermittently dispersed about the un-stretched regions;
- wherein the stretched regions of the at least one film layer are more opaque than the un-stretched regions of the at least one film layer, and the multi-layered thermoplastic film is nonporous.

11. The multi-layered thermoplastic film as recited in claim 10, wherein at least a second layer of the plurality of film layers is devoid of voiding agents.

12. The multi-layered thermoplastic film as recited in claim 10, wherein the at least one film layer includes between about 65 and about 99 percent by weight of linear low-density polyethylene, and between about 1 and about 35 percent by weight of the voiding agent.

13. The multi-layered thermoplastic film as recited in claim 12, wherein the voiding agent comprises calcium carbonate.

14. The multi-layered thermoplastic film as recited in claim 10, wherein the stretched regions of the at least one film layer are non-porous.

15. The multi-layered thermoplastic film as recited in claim 10, wherein the stretched regions comprise one or more of:
- stripes extending along the plurality of film layers in a direction transverse to a direction in which the plurality of film layers were extruded;
- stripes extending along the plurality of film layers in a direction in which the plurality of film layers were extruded; or
- discontinuous strainable networks extending in a direction transverse to direction in which the plurality of film layers were extruded.

16. The multi-layered thermoplastic film as recited in claim 1, wherein the stretched regions in the first layer are porous.

17. The thermoplastic film as recited in claim 10, wherein the stretched regions in at least one film layer are porous.

18. The thermoplastic film as recited in claim 10, wherein a color of the stretched regions differs from a color of the un-stretched regions.

19. The thermoplastic film as recited in claim 10, wherein an average thickness of the stretched regions is less than an average thickness of the un-stretched regions.

20. The thermoplastic film as recited in claim 10, wherein the stretched regions comprise one or more of:
- stripes extending along the thermoplastic film in a direction transverse to a direction in which the thermoplastic film was extruded;
- stripes extending along the thermoplastic film in a direction in which the thermoplastic film was extruded; or
- discontinuous strainable networks extending in a direction transverse to direction in which the thermoplastic film was extruded.

* * * * *